US006953262B2

(12) United States Patent
Cleaver et al.

(10) Patent No.: US 6,953,262 B2
(45) Date of Patent: *Oct. 11, 2005

(54) ILLUMINATION DEVICE FOR SIMULATION OF NEON LIGHTING

(75) Inventors: Mark Joseph Cleaver, Wilmette, IL (US); Eric Olav Eriksson, Evanston, IL (US); George R. Hulse, Cookeville, TN (US)

(73) Assignee: i Light Technologies, Inc., Evanston, IL (US)

( * ) Notice: Subject to any disclaimer, the term of this patent is extended or adjusted under 35 U.S.C. 154(b) by 196 days.

This patent is subject to a terminal disclaimer.

(21) Appl. No.: 10/413,005

(22) Filed: Apr. 14, 2003

(65) Prior Publication Data

US 2003/0198046 A1 Oct. 23, 2003

Related U.S. Application Data

(63) Continuation of application No. 09/982,705, filed on Oct. 18, 2001, now Pat. No. 6,592,238.
(60) Provisional application No. 60/265,522, filed on Jan. 31, 2001.

(51) Int. Cl.[7] .............................................. F21V 21/00
(52) U.S. Cl. ....................... 362/219; 362/249; 362/800; 362/267; 362/235
(58) Field of Search ................................ 362/551, 555, 362/582, 219, 235, 800, 249, 267, 310; 385/901

(56) References Cited

U.S. PATENT DOCUMENTS

| 4,607,317 | A | * | 8/1986 | Lin ............................. 362/249 |
| 5,057,981 | A | * | 10/1991 | Bowen et al. .............. 362/219 |
| 5,964,981 | A | * | 10/1999 | Nelson et al. .............. 156/423 |
| 6,146,006 | A | * | 11/2000 | Cross ......................... 362/555 |
| 6,193,385 | B1 | * | 2/2001 | Maki et al. ................. 362/108 |
| 6,361,186 | B1 | * | 3/2002 | Slayden ..................... 362/249 |
| 6,366,727 | B1 | * | 4/2002 | Nojiri et al. ................ 385/123 |
| 6,582,103 | B1 | | 6/2003 | Popovich et al. |
| 6,676,284 | B1 | | 1/2004 | Wilson |

FOREIGN PATENT DOCUMENTS

| JP | 55-97903 | 7/1980 |
| JP | 62-41185 | 3/1986 |
| JP | 61-165583 | 10/1986 |
| JP | 61-286878 | 12/1986 |
| JP | 6-12021 | 1/1994 |
| JP | 3007923 | 12/1994 |
| JP | 2000-29406 | 1/2000 |
| JP | 2000-307152 | 11/2000 |

* cited by examiner

Primary Examiner—Thomas M. Sember
(74) Attorney, Agent, or Firm—Stites & Harbison, PLLC; Vance A. Smith; David W. Nagle, Jr.

(57) ABSTRACT

An illumination device for simulating neon lighting comprising a plurality of spaced point light sources positioned adjacent a lateral light receiving surface of a substantially rod-like waveguide made of a material that preferentially scatters light entering the light receiving surface such that the light intensity pattern exiting a lateral light emitting surface of the waveguide has a substantially uniform light intensity pattern.

8 Claims, 9 Drawing Sheets

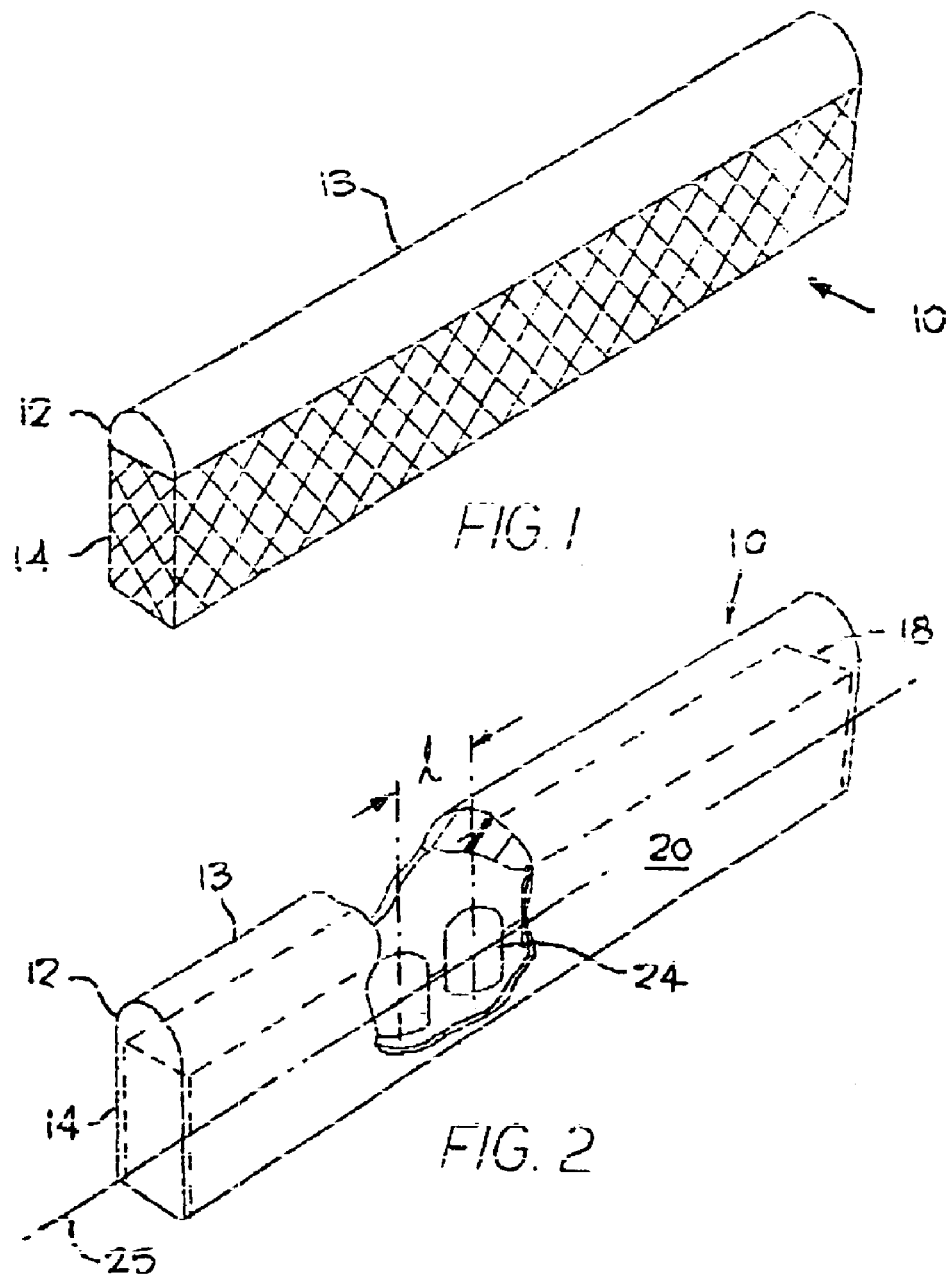

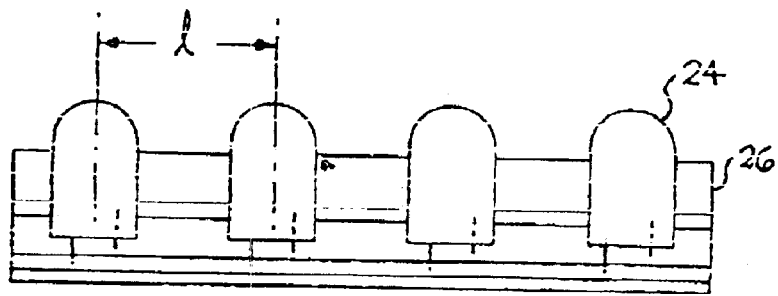
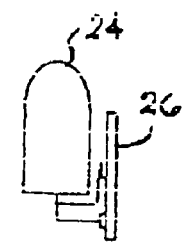
FIG. 4    FIG. 5
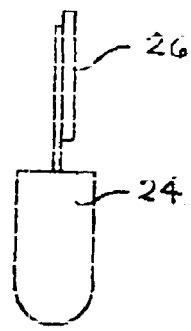
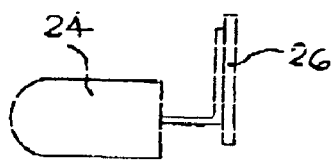
FIG. 5A    FIG. 5B
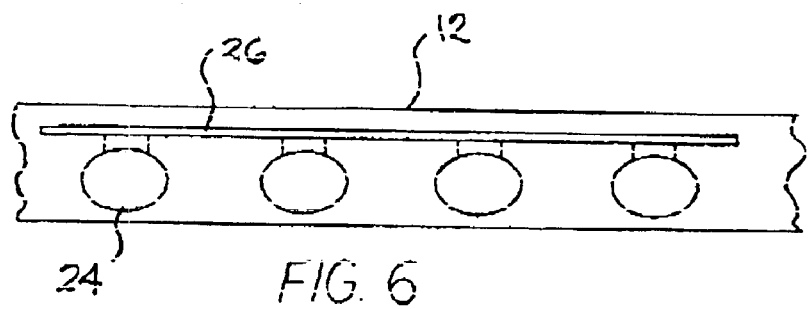
FIG. 6

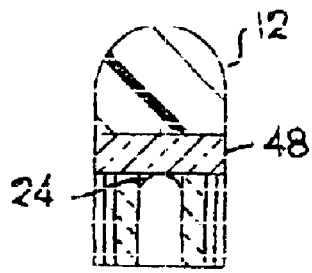 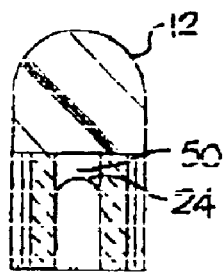 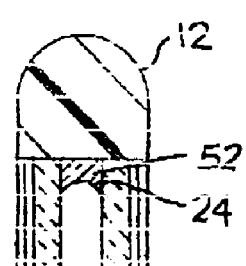
FIG. 9A    FIG. 9B    FIG. 9C
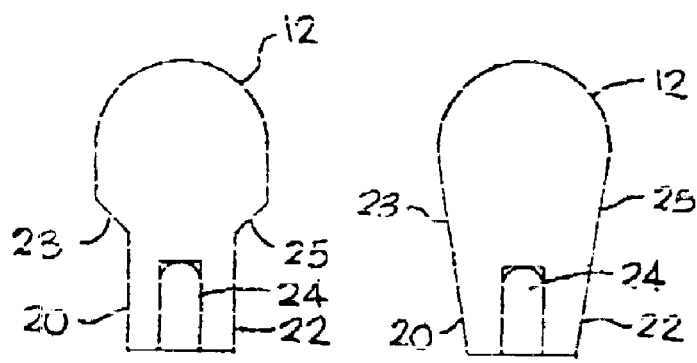
FIG. 10A    FIG. 10B
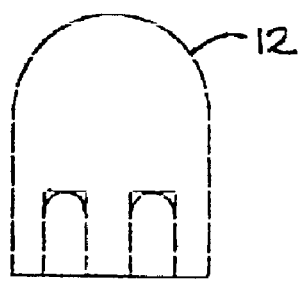
FIG. 11

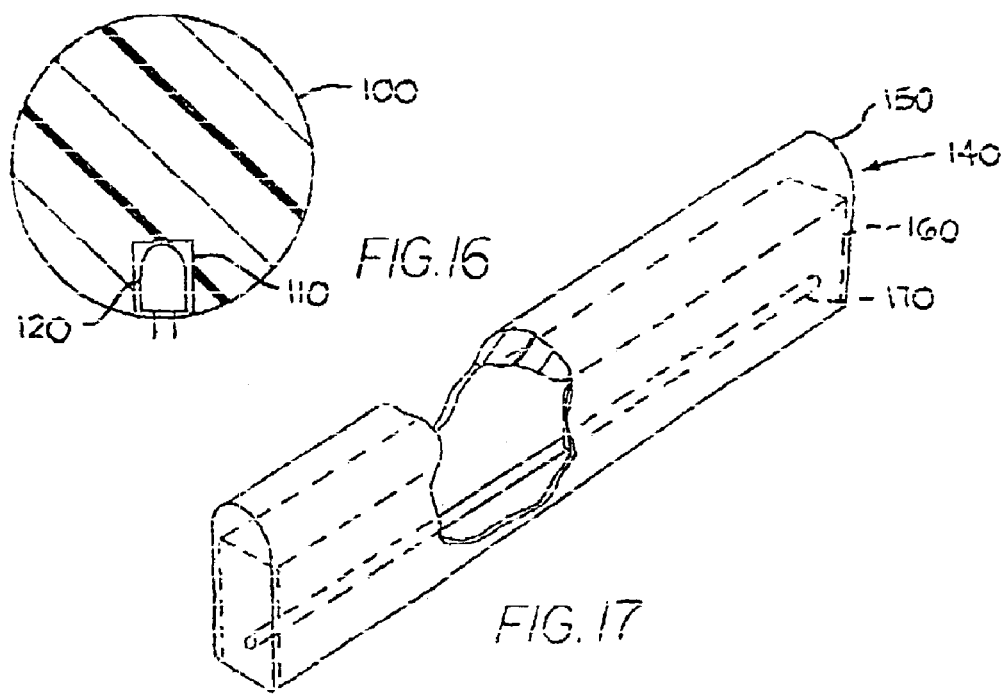
FIG. 16
FIG. 17
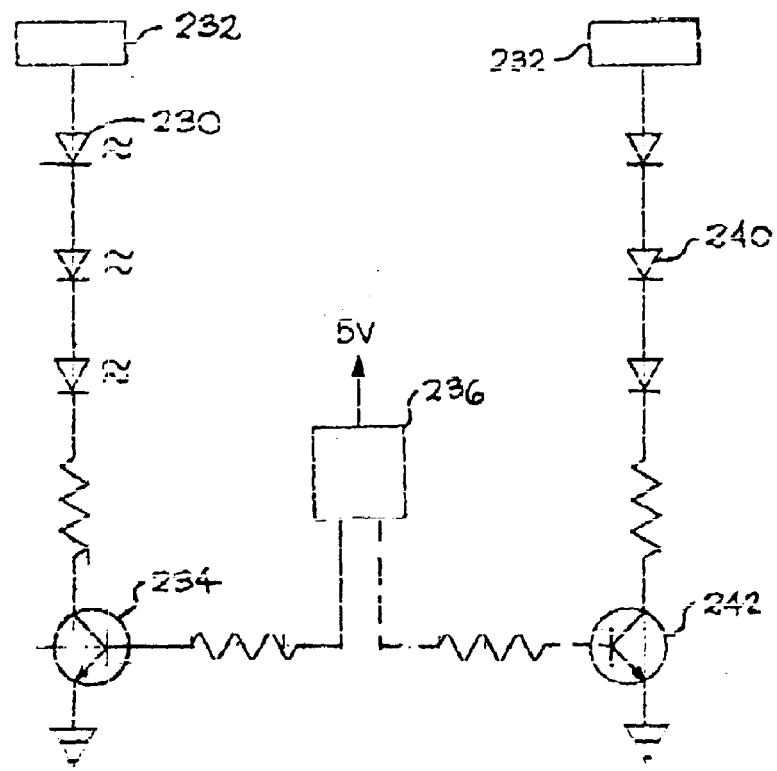
FIG. 18

ILLUMINATION DEVICE FOR SIMULATION OF NEON LIGHTING

This application claims priority from Provisional Application No. 60/265,522 filed Jan. 31, 2001 entitled Simulated Neon Lighting for Illumination of Objects, and is a continuation of U.S. application Ser. No. 09/982,705 filed on Oct. 18, 2001, now U.S. Pat. No. 6,592,238.

BACKGROUND OF THE INVENTION

The present invention relates to illumination devices using optical waveguide and, more particularly, to lighting devices for the simulation of neon lighting using optical waveguides and high intensity low voltage light sources and ideally adapted for signage and advertising uses.

Neon lighting, produced by the electrical stimulation of the electrons in the low pressure neon gas filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications including script writing and designs because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have axially even light distribution over its length and substantially even about its circumference. Equally important, such lighting devices must have a brightness that is at least comparable to neon lighting. Further, since neon lighting is a well established industry, a competitive lighting device must be light in weight and have superior "handleability" characteristics in order to make inroads into the neon lighting market. Neon lighting is recognized as being fragile in nature. Because of the fragility and heavy weight primarily due to its supporting infrastructure, neon lighting is expensive to package and ship. Moreover, it is extremely awkward to initially handle, install, and/or replace neon lighting structures. Any lighting device that can provide those previously enumerated positive characteristics of neon lighting while minimizing its size, weight, and handleability shortcomings will provide for a significant advance in the lighting technology.

U.S. Pat. No. 4,891,896 issued on Jan. 9, 1990 to Boren and assigned to the Gulf Development Company is an example of many attempts to duplicate neon lighting. Like this attempt, most prior art neon simulations have resulted in structures difficult to fabricate and providing a little in the way of weight and handling benefits. The Boren patent exemplifies this by providing a plastic panel with essentially bas-relief lettering. The material comprising the lettering is transparent and coated with a translucent material. The surrounding material is opaque. When the panel is back lit the lettering tends to glow with a neon-like intensity.

The more recent introduction of light weight and breakage resistant point light sources as exemplified by high intensity light emitting diodes ("LEDs") have shown great promise to those interested in illumination devices that may simulate neon lighting and have stimulated much effort in that direction. However, the twin attributes of neon lighting, uniformity and brightness, have proven to be difficult obstacles to hurdle as such attempts to simulate neon lighting have largely been stymied by the tradeoffs between light distribution to promote the uniformity and brightness. For example, U.S. Pat. No. 4,976,057 issued Dec. 11, 1990 to Bianchi describes a device that includes a transparent or translucent hollow plastic tubing which is mounted in juxtaposition to a sheet of material having light transmitting areas that are co-extensive to the tubing. The sheet is back lit by light sources such as LEDs which trace the configuration of the tubing. The tubing can be made into any shape including lettering. While the tubing may be lit by such arrangement, the light transfer efficiencies with such an arrangement is likely to result in a "glowing" tube having insufficient intensity to match that of neon lighting. The use of point light sources such as LEDs may provide intense light that rival or exceed neon lighting, but when arranged in arrays lack the uniformity needed and unfortunately provide alternate high and low intensity regions in the illuminated surfaces. Attempts to smooth out the light has resulted in lighting that has unacceptably low intensity levels.

It is therefore a paramount object of the present invention to provide for an energy efficient, virtually unbreakable alternative to neon lighting.

A further important object of the present invention is to provide for a lighting device that is safe to transport and economical to operate while providing all of the application virtues of neon lighting including uniformity and brightness.

Yet another object of the present invention is to provide for an alternative to neon lighting that is environmentally friendly, requiring no neon gas, and running on significantly less electricity that its neon equivalent.

Still another important object is to provide for a neon equivalent that is easy to install without complex high voltage electrical installations.

Yet a further object is to provide for a lighting device that can be placed in hostile environments such as in a freezer case without need for protective guards against accidental contact by customers.

These and other objects of the invention will become readily apparent and addressed through a reading of the discussion below and appended drawings.

SUMMARY OF THE PRESENT INVENTION

The present invention utilizes a profiled rod of material having waveguide characteristics that preferentially scatters light entering one lateral surface ("light receiving surface") so that the resulting light intensity pattern emitted by another lateral surface of the rod ("light emitting surface") is elongated along the length of the rod. A light source extends along and is positioned adjacent the light receiving surface and spaced from the light emitting surface a distance sufficient to create an elongated light intensity pattern with a major axis along the length of the rod and a minor axis that has a width that covers substantially the entire circumferential width of the light emitting surface. In a preferred arrangement, the light source is a string of point light sources spaced a distance apart sufficient to permit the mapping of the light emitted by each point light source into the rod so as to create elongated and overlapping light intensity patterns along the light emitting surface and circumferentially about the surface so that the collective light intensity pattern is perceived as being uniform over substantially the entire light emitting surface when being viewed from a normal head-on and side perspectives.

DETAILED DESCRIPTION OF THE INVENTION

Figure 3:
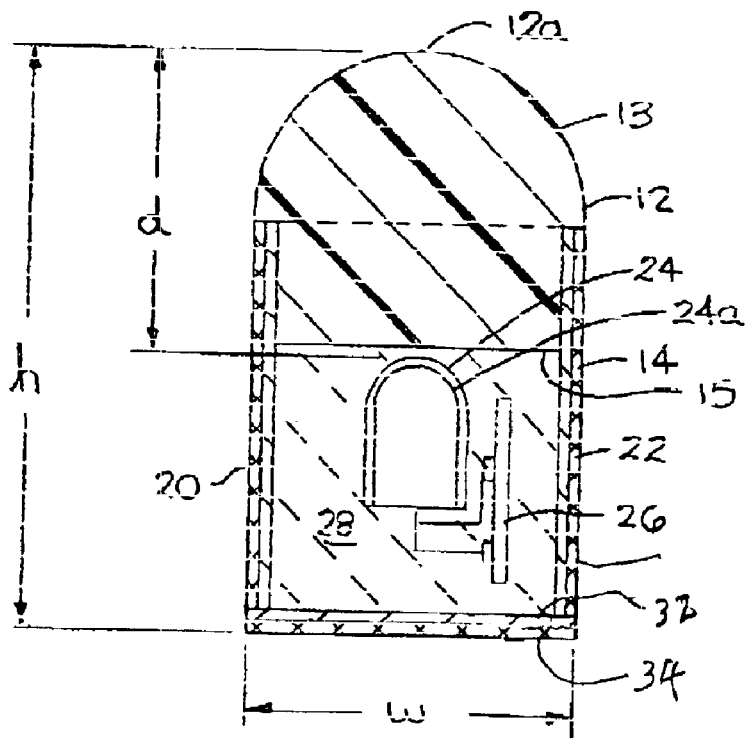
FIG. 3 is an expanded side view of the illumination device as shown in FIG. 1.

To provide the desired result, i.e., an illumination device that is an effective simulator of neon lighting, it is important that the proper materials be selected for the component parts and those parts appropriately and geometrically positioned so that the resulting illumination device has an essentially uniform light intensity distribution pattern over the entire surface with the maximum obtainable brightness. To accomplish this, it is necessary to use a high intensity but dimensionally small light source together with an element that acts both as an optical waveguide and light scattering member, but permits light to exit laterally out of its surface (a "leaky waveguide"). By placing the light source contiguous such a leaky waveguide in a specific manner so as to cause the waveguide to uniformly glow over its lateral surface while maximizing the amount of light exiting the surface, applicants are able to obtain an illumination device that rivals or surpasses the uniform glow of neon tubing. There are many light sources which have the necessary light intensity output that is required but most are dimensionally too big to be practical, are fragile, or consume too much energy. It has been further observed that the best light source would likely be one with a small diameter that provided a uniform light output over an extended length. However, such light sources have not yet been developed to the technological state providing the intensity needed. Thus, applicants have determined that the best available light source for the purpose here intended is a string or strings of contiguously mounted, essentially point light sources such as spaced apart high intensity LEDs.

The ultimate objective of the illumination device of the present invention is to simulate an illuminated neon tube that glows with the proper intensity and uniformity over its length. Thus, applicants have determined that it is important that the leaky waveguide (used to simulate the neon tube) be comprised of a profiled rod of material having sufficient diffusivity that collectively with the other components of the invention visually eliminates any recognizable individual light distribution light pattern that originates from a respective LED or other light source. As stated above, the profiled waveguide preferentially scatters light along its length but ultimately allows light to exit through its lateral surfaces. Such a waveguide provides a visible elongated or oval-like light pattern for each LED, brightest at the center and diminishing continuously out from the center along the major and minor axis of the pattern. By spacing the LEDs a certain distance apart and each LED an appropriate distance from the exposed and lateral far side of the leaky waveguide, the light intensity distribution patterns on the surface of far side of the leaky waveguide are caused to overlap to such an extent that the variations in the patterns are evened out. This causes the collective light pattern on the lateral surface to appear to an observer to have an uniform intensity along the length of the waveguide. Other components of the illumination device of the present invention including, for example, the shape of the light sources may assist in establishing the required brightness and uniformity.

Structurally, the preferred embodiment of the present invention is portrayed in FIGS. 1–6 and shown generally as character numeral 10. The device 10 may be considered as having two major body components. The first component is a waveguide 12 having an exposed curved lateral surface 13 serving as the light emitting surface and a hidden lateral surface 15 (best seen in FIG. 3) that serves as the light receiving surface. Waveguide 12 is the aforementioned leaky waveguide and surface 13 serves as the counterpart to the neon tube. That is, the light laterally entering the waveguide from a light source juxtaposed to the surface 15 is preferentially scattered so as to exit with a broad elongated light intensity distribution pattern out of surface 13.

Visually, the waveguide 12, when not illuminated internally, has a milky appearance due to the uniform scattering of ambient light that enters the waveguide and that ultimately exits the lateral surface thereof. Applicants have found that acrylic material appropriately treated to scatter light and to have high impact resistant to be the preferred material for use in forming the waveguide components of the present invention. When shaped into the profiled rods, the rods take on the desired leaky waveguide characteristics. Moreover, such material is easily molded or extruded into rods having the desired shape for whatever illumination application may be desired, is extremely light in weight, and withstands rough shipping and handling. While acrylic material having the desired characteristics is commonly available, it can be obtained, for example, from AtoHaas, Philadelphia, Pa. under order number DR66080 with added frosted characteristics. When shaped into a rod, such acrylic material is observed to have the leaky waveguide characteristics desired. Other materials such as such as beaded blasted acrylic or polycarbonate, or painted acrylic or polycarbonate provided with the desired preferential light scattering characteristics may be used as well for other applications.

Figures 3A, 3B:
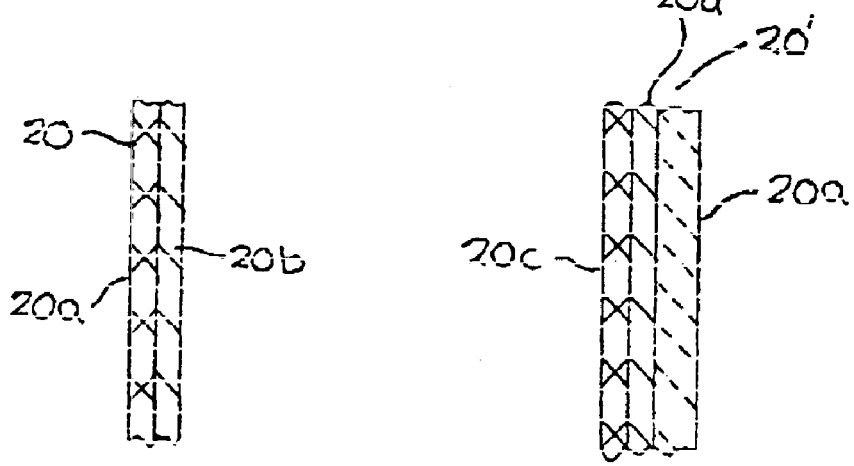
FIG. 3A is an enlarged wall segment of the illumination device shown in FIG. 3.
FIG. 3B is an enlarged wall segment like that shown in FIG. 3A with a variation in its structure.

The second component of the present invention is a housing 14 positioned adjacent the surface 15 of the waveguide 12. Housing 14 comprises a pair of side walls 20, 22 abutting and downwardly extending from the surface 14 and defining an open ended channel 18 that extends substantially the length of waveguide 12. The housing 14 generally functions to house the light source and electrical accessories and to collect light not emitted directly into surface 15 and redirect it to the waveguide In other words, the housing further serves to increase the light collection efficiency by directing by reflection the light incident upon the internal surfaces of the housing into the waveguide 12 and assist in the scattering of the light. From a viewer's perspective, it is desirable that the visual appearance of the housing 14 not be obtrusive with respect to the glowing surface 13 of the waveguide 12; thus, it is preferred that the outside surface of the housing be light absorbing and thus visually dark to an observer. Again, it is preferred that the housing also be made from an impact resistant acrylic material with the outer walls 20 and 22 having an outer regions formed from a dark pigmented, thus light absorbing, acrylic while the inner regions are made from a white pigmented, thus light reflecting, acrylic. The two regions are best viewed in FIG. 3A show an enlarged segment of wall 20 in which the outer region 20a is the dark acrylic and the inner region 20b is the white acrylic. Such acrylic materials preferably are the same as used for the waveguide. While the waveguide 12 and housing 14 may be separately formed and then appropriately joined, it is preferred that the components be molded or extruded as a unit in long sections with the channel 18 already formed.

An alternate wall structure is shown in FIG. 3B in which the wall 20' has three components, an outer dark region 20c, and intermediate light reflecting 20d, and a transparent wall 20e which may be comprised of a scattering acrylic like the waveguide. The outer and intermediate regions 20c and 20d could be dark and white coatings painted on the wall 20' which itself may be comprised of a transparent acrylic material or scattering acrylic. The light reflecting coatings can be of a color matching the color of the LED if desired.

Although the above discussion sets forth a preferred construction of the housing, it should be understood that in some applications the reflecting and absorption characteristics may be provided by light reflecting and absorption paint or tape. Additionally, where there is little concern about the visibility of the housing, it may not be necessary to provide the light reflecting and/or absorption characteristics to the outer surface of the side walls.

Figures 5A, 5B:
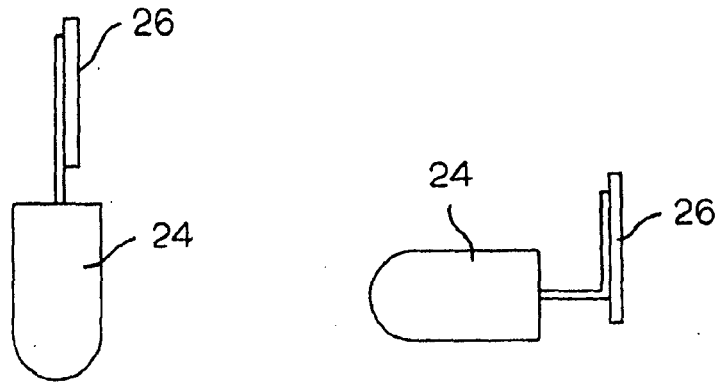
FIGS. 5A and 5B show side views of alternate configurations of the diodes and electrical board as positioned in the present invention.

One the most beneficial attributes of the present invention is the ease that the illumination device 10 can be bent to form designs or lettering. The channel 18 permits the device 10 can easily be deformed and bent into the desired shape. Once the device 10 has been shaped, the LEDs 24 and the electrical connection board 26 are then inserted into the channel 18 and then the channel 18 be filled with a filler compound. Thereafter the filler or potting compound is permitted to harden, thus maintaining the positioning of the LEDs and circuit board 26. There are various configurations of the LEDs 24 and board 26 that may be positioned within the channel 18. Examples of the configurations are shown in FIGS. 5A and 5B. A preferred configuration is that shown in FIG. 5 because of the compact nature of the arrangement. In this arrangement, it is important, however, to observe the orientation of the circuit board 26 within channel 18 so that the board 26 extends along the length of channel to facilitate bending. The flexibility of the circuit board 26 with attached LEDs 24 permit this post design insertion into the channel 18 with the apex of the LED 24 essentially abutting the lower surface of the waveguide 12 (as illustrated in FIG. 3). It is also important that the potting compound 30 used to fill channel 18 have the desired light transmitting characteristics and be effective in maintaining the positioning of both the LEDs and the board. The potting compound further serves to eliminate air gaps between the LEDs and the waveguide. It is preferable that the potting compound harden into an impact resistant material having an index of refraction essentially matching that of the housing 24a of the LEDs 24 to minimize Fresnel losses at the interface there between. The potting compound further adds strength to the structure by filling in the channel 18 and assists in reducing hot spots from forming on the lateral surface 13. Such potting compounds may be selected from commonly available clear varieties such as, for example, that obtainable from the Loctite Corporation, Rocky Hill, Conn. under the brand name Durabond E-00CL. As is also seen in FIG. 3, the bottom surface of the device 10 may be covered with a light reflecting surface 32 which may be, for example, a white potting compound or paint and this optionally covered with a light absorbing material 34. In those instances where the selected LEDs 24 have a certain color the light reflecting surface may also be selected to have a matching or substantially the same color. To take advantage of ambient light certain dyes may be added to the acrylic material so that the device 10 exhibits some readily distinguishable coloring upon viewing.

The intensity of the point light sources preferably used by the present invention are typically sufficient to provide the requisite brightness. It bears repeating that the quintessentially feature of the present invention, however, is the careful spreading or distribution of the individual light patterns of the point light sources such that the light patterns are preferentially expanded along the light emitting surface and form an oblong or oval-like light intensity pattern. Equally important is that the minor axis of the oval-like light intensity pattern extends substantially the entire circumferential width of the curved light emitting surface. The preferential spreading of each of the light intensity patterns along the waveguide also permits an the overlapping of the individual light patterns. This in turn enables the present invention to provide an observed uniform collective light pattern along and over the entire light emitting surface.

Figure 2:
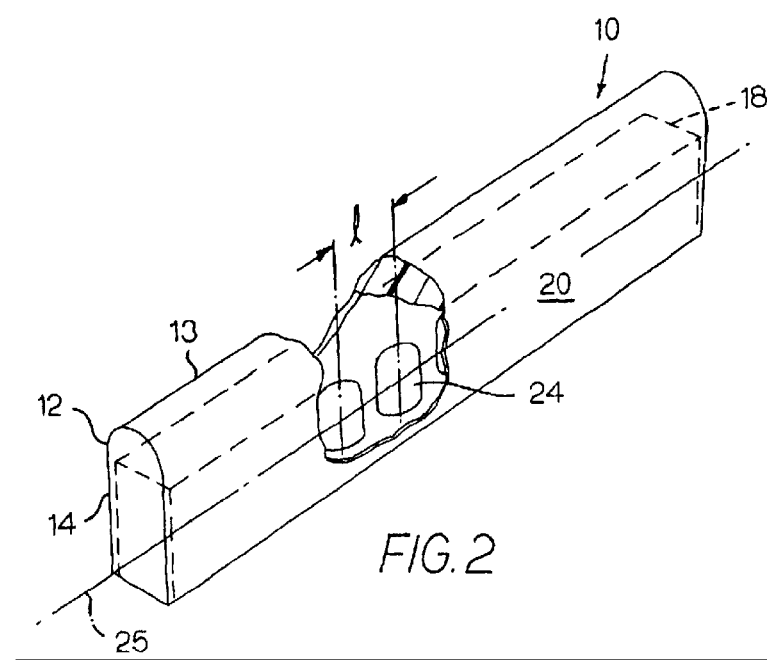
FIG. 2 is perspective similar to that of FIG. 1 with a portion broken away to show the interior.
Figure 3:
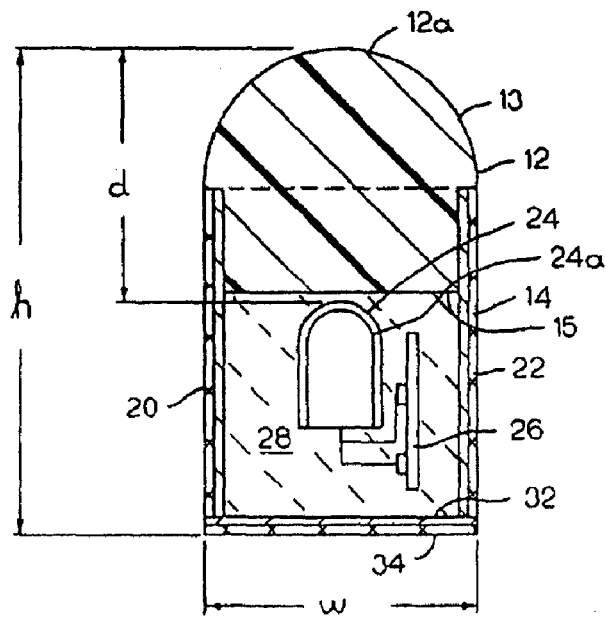
Figure 3A:
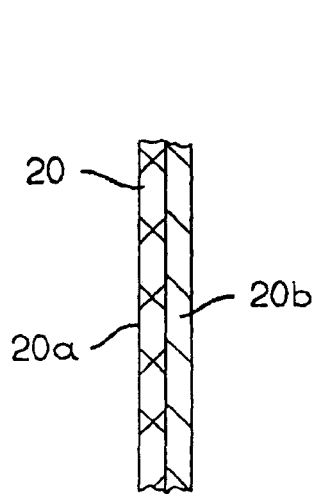
Figure 3B:
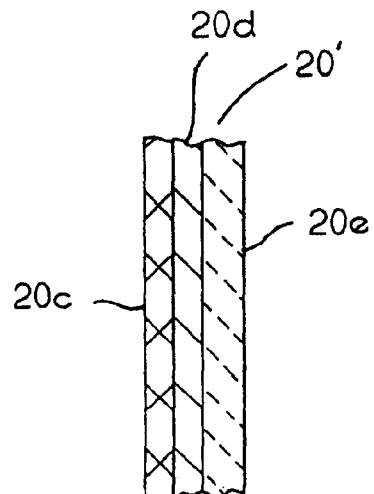
Figures 4, 5:
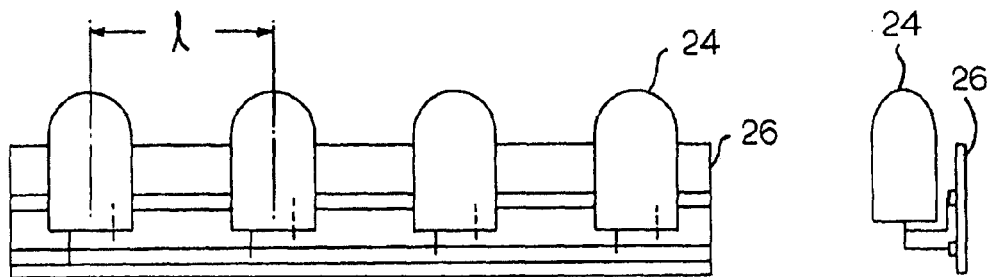
FIGS. 4, 5, and 6 are respective front, side, and top elevation views of the diodes connected to an electrical board as used in the present invention with FIG. 5 also showing the configuration of the light emitting diodes and electrical board within the device.

There are various parameters that have an impact on both the brightness and uniformity of the light intensity pattern emitted by the surface 13 of the waveguide 12. Among the most important are the scattering characteristics of the waveguide material, the spacing "l" between LEDs 24 as shown in FIG. 2, the lensing effect of the LED housing and internal optics where the light emitting portion of the LED resides, the shape and structure of the housing, and the distance "d" (shown in FIG. 3) from the apex of the LED housing 24a to the apex point 12a on the lateral surface 13. To promote uniformity of the light intensity distribution pattern on the surface of the waveguide is that the line of LEDs 24 must be positioned a predetermined distance "d" from apex point 12a of the waveguide. Positioning the LEDs 24 too close to the surface will cause a "hot spot", i.e., a region of higher light intensity to locally appear on the surface 12a of the waveguide and spoil the quality of the uniform glow. Placing in too far from surface 12a will clearly and undesirably diminish the overall light intensity emanating from the waveguide 12 and may also prevent the minor axis of the oblong or elliptical-like pattern from extending over the circumferential width of the light emitting surface. As an example only, it has been determined that when the curved surface has a radius of curvature of about 3/16 (about 4.76 mm), the device 10 (shown in FIG. 3) has a height "h" of about 31 mm and a width "w" of about 9.5 mm, and the LEDs have a candle power of about 280 mcd and are spaced apart about 12 mm, the distance "d" should be about 17.75 to 17.80 mm. It should be understood, however, that while the above describes a preferred waveguide structure that resembles neon tubing dimensionally, other and different shapes of waveguides may be used yet still providing the desired uniform glow.

Figure 7A:
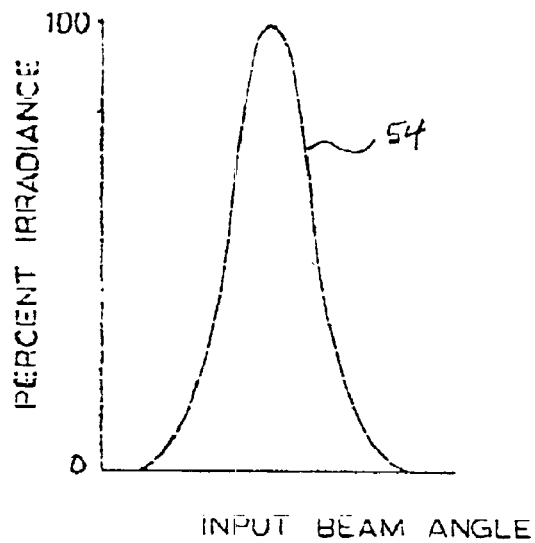
FIGS. 7A and 7B show, respectively, a graph illustrating the light distribution characteristics of a single point light source and a schematic of the device used to measure the same.
Figure 7B:
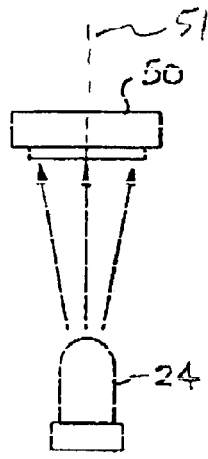
Figure 7C:
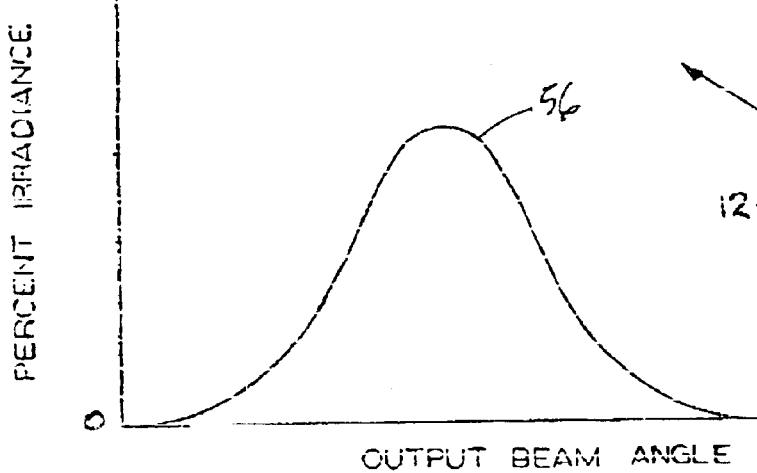
FIGS. 7C and 7D show, respectively, a graph illustrating the light distribution characteristics of a single point light source mounted within a device constructed in accordance with the present invention and a schematic of the device used to measure the same.
Figure 7D:
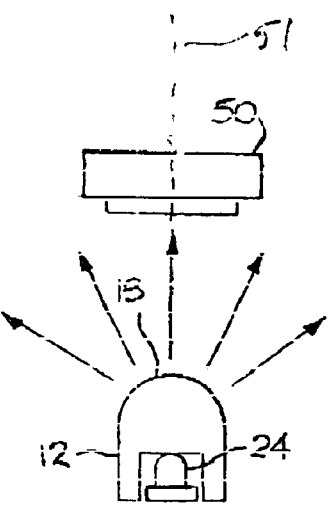
Figure 7E:
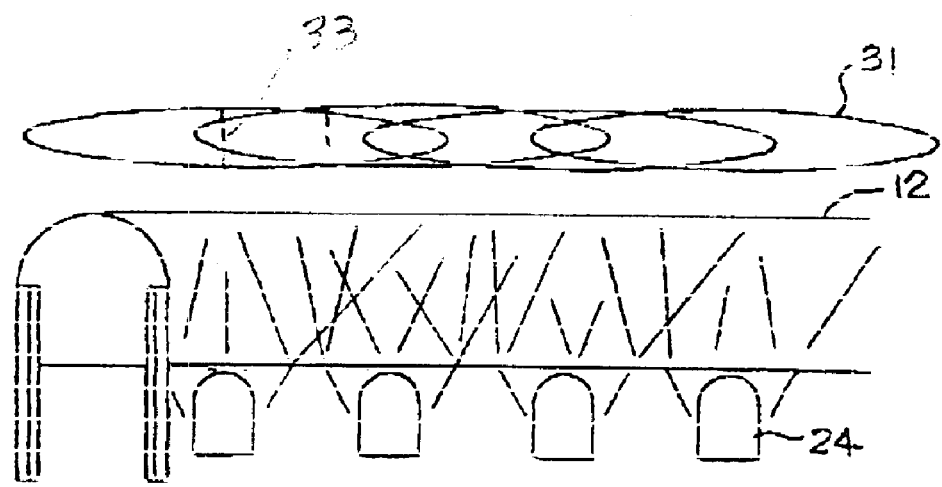
FIGS. 7E and 7F show, respectively, a Mercator-like top projection and a side schematic of the illuminated lateral surface of the waveguide with overlapping individual light distribution patterns.
Figure 7F:
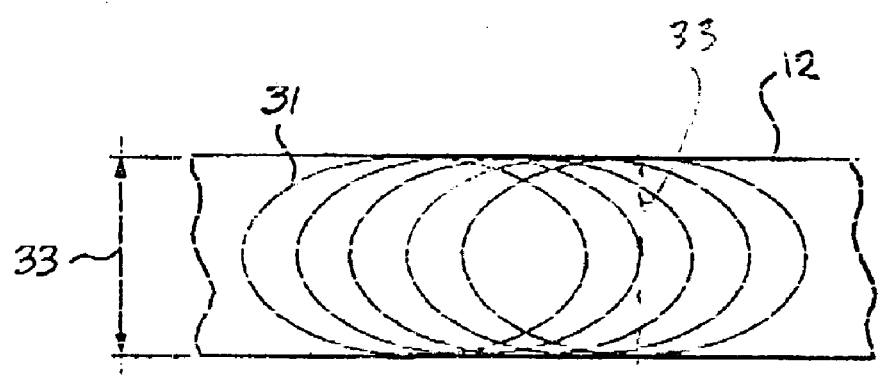

To better understand the principal under which the present invention operates, reference is now made to FIGS. 7A–7F as examples of the changes of the light intensity and spread of the light pattern comparing light intensity and spread of a typical diode to that of an illuminating device constructed in accordance with the present invention. A single LED or point light source provides a narrow light intensity pattern 54 as graphically portrayed by FIG. 7A. Such a graph can be generated by using a photocell type of device 50 portrayed in FIG. 7B and progressively measuring the light intensity at various angles from the center line 51. This light pattern 54 should be contrasted to the one in FIG. 7C in which the pattern 56 is considerably broader with a concomitant reduction in the intensity along the center line 51. FIG. 7C represents the broad pattern emitted by the lateral surface 13 of the waveguide 12 constructed in accordance with the present invention. As stated above, it is important that the distance "d" and the LED spaced apart distance "l" be such that the oval-like intensity patterns of the individual LEDs overlap as portrayed in the schematic representation of FIG. 7E and the projection depicted in FIG. 7C schematically represents a plurality of LEDs 24 providing an broadened overlapping elliptical-like light intensity patterns 31 on the lateral surface 13 of the waveguide 12. FIG. 7E is top view using a Mercator-like projection of the light pattern areas 24 on the lateral surface. 13. The minor axis of the light intensity patterns 31 are represented by dashed lines 33. As stated above, for any given dimension of the waveguide and spacing of the point light sources, it is important that the distance "d" be appropriately set so distance so that the minor axis of the light intensity distribution pattern extends substantially the entire circumferential width of the curved lateral light emitting surface 13. For purposes of this disclosure the light intensity distribution pattern can be defined as the visible area of the light pattern extending out from the center region of the area that is visible discernible by an observer.

Figure 8:
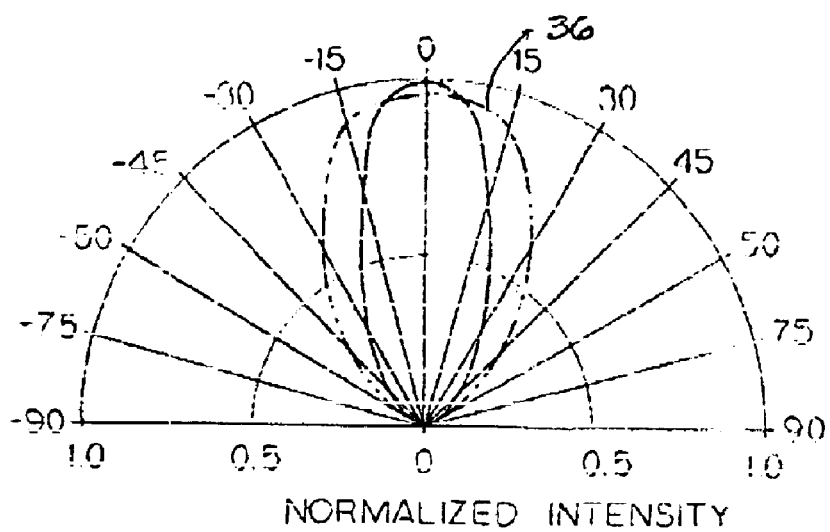
FIG. 8 is normalized pattern of the light distribution using an elliptically shaped LED assisting in creating the elongated light intensity pattern.
Figure 6:
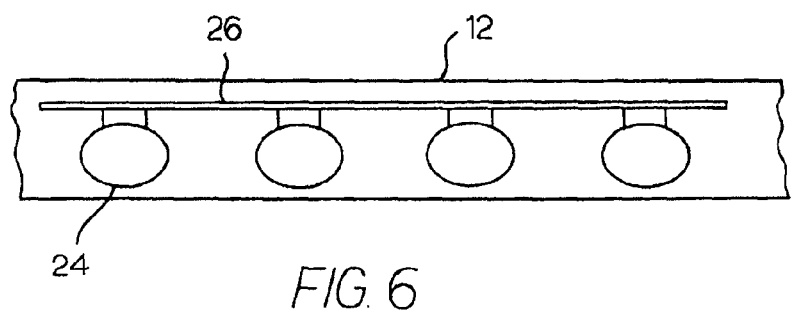
Figure 7A:
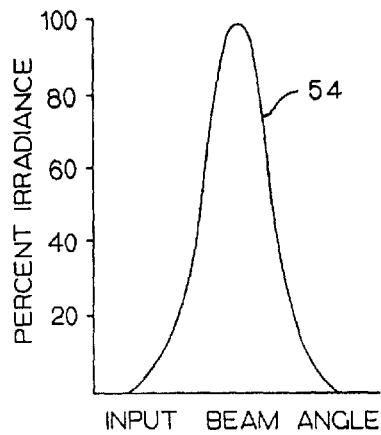
Figure 7B:
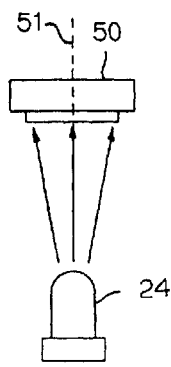
Figure 7C:
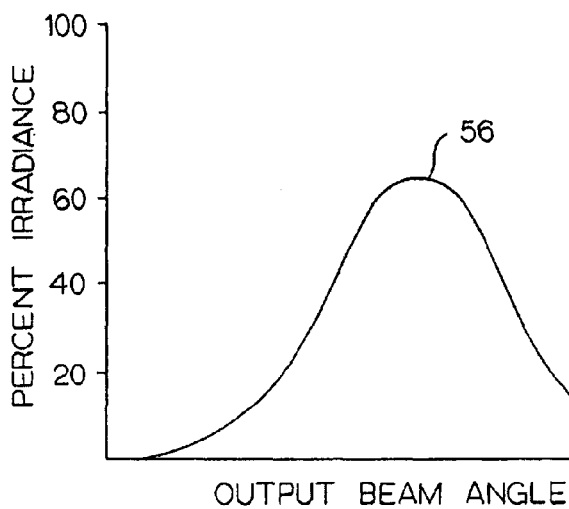
Figure 7D:
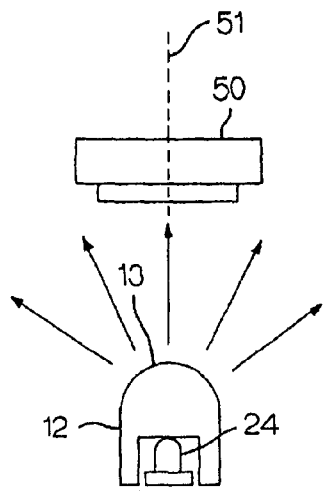
Figure 7E:
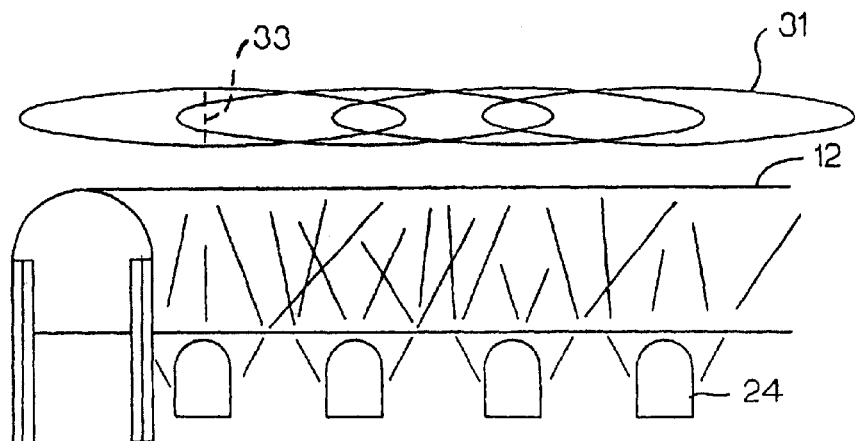
Figure 7F:
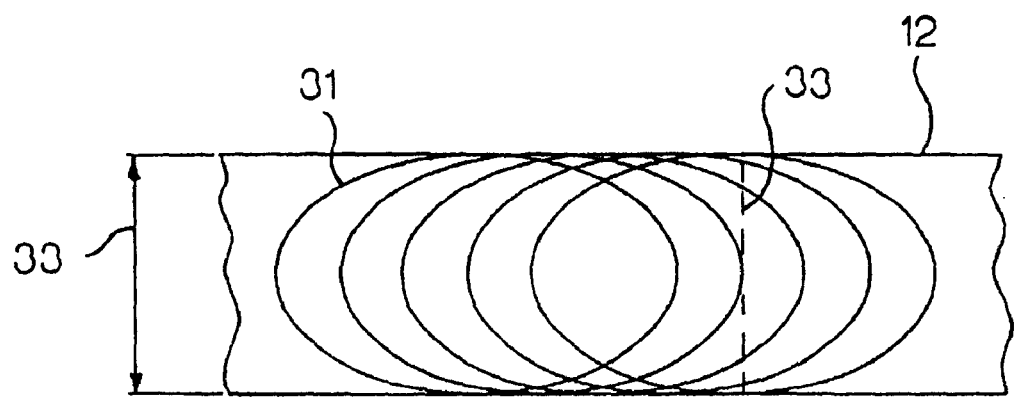
Figure 8:
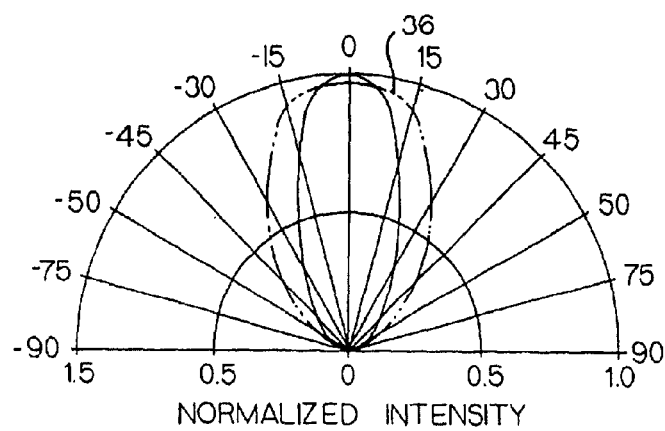
Figure 12:
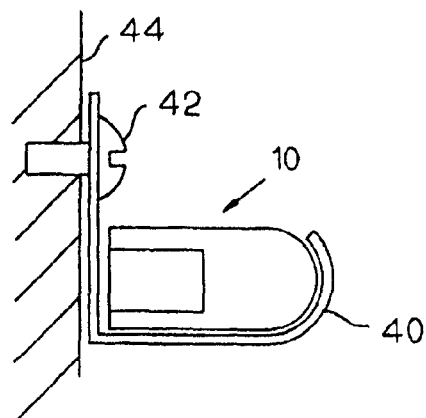
Figure 13:
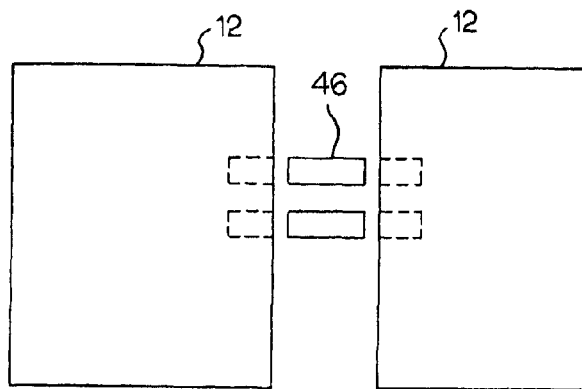
Figure 14:
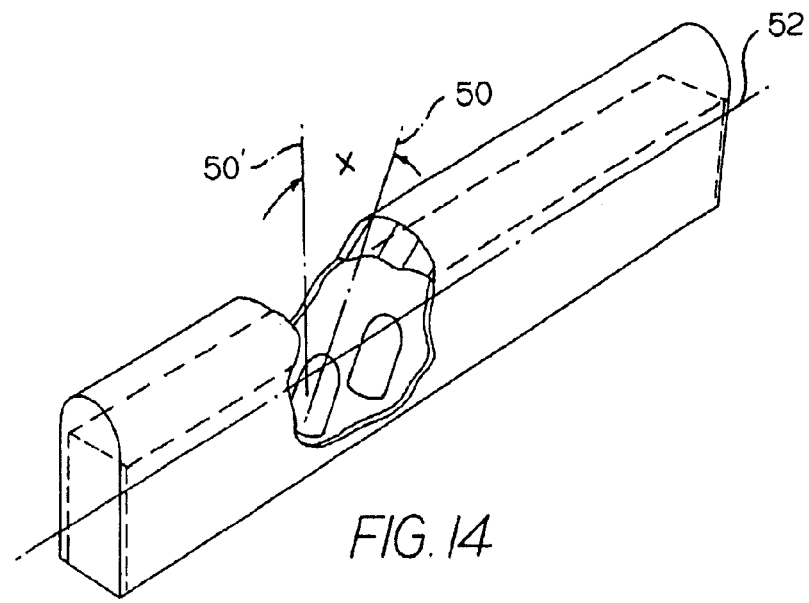
Figure 15:
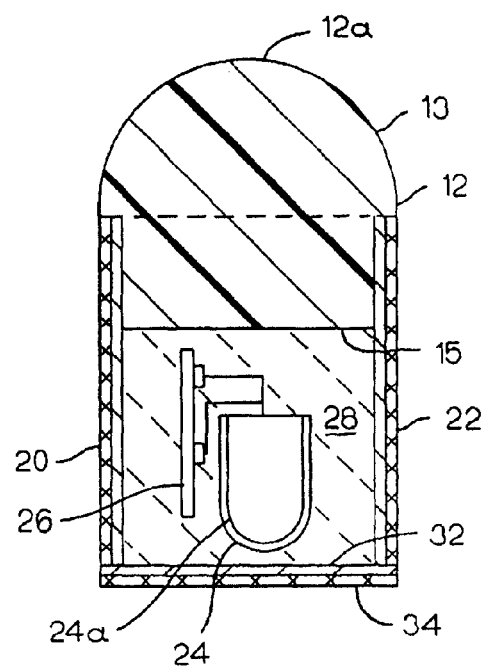

To further assist in the preferential diffusion and scattering of the light intensity pattern, applicant has further determined that the use of oval shaped LEDs as shown in FIG. 6 are helpful. The best effect is obtained when the oval shaped LEDs are positioned so that the major axis of the elliptically shaped light patterns seen in top elevation view is directed along the long axis of the waveguide 12. The characteristic light pattern of an oval LED is shown in FIG. 8 depicting graphically normalized light intensity along the major and minor axis. As can be seen, the oval LED tends to direct light along its major axis illustrated by the curve 36.

Figure 12:
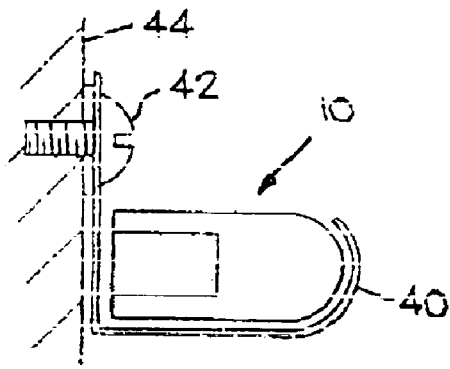
FIG. 12 shows one technique of supporting an illumination device made in accordance with present invention.
Figure 13:
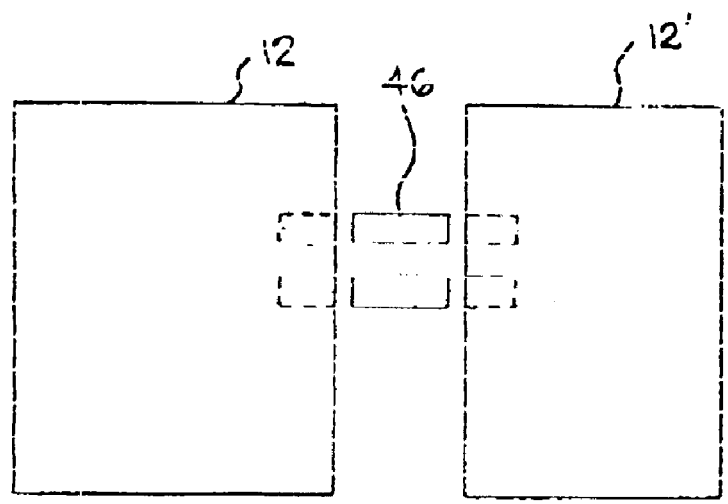
FIG. 13 shows a technique of connecting individual lighting devices made in accordance with the present invention.

The light weight and ruggedness of the illumination device 10 of the present invention lends itself to ready mounting to almost any surface and by a variety of mounting techniques. For example, as illustrated in FIG. 12, an extended length of the device 10 could be mounted in curtain rod fashion to a wall board 44 through the use of a bracket hook 40 and fastener 42. Moreover, successive lengths of the device 10 can be easily juxtaposed such as, for example, depicted in FIG. 13 where dowels 46 of matching refractive indices with the material of the waveguides 12, 12' are inserted in complimentary openings in the respective ends. Other fastening techniques may be employed including gluing of the various lengths together at the ends thereof. In some instances where the lengths when appropriately supported, the ends of the lengths may merely be placed in a juxtaposed touching position. Thus, as can easily be understood, illumination devices 10 of an indeterminate length can easily be installed and supported.

Figure 9A:
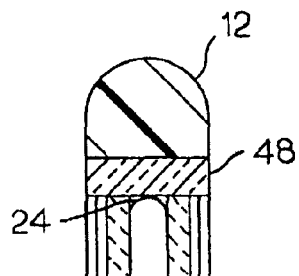
FIGS. 9A, 9B, and 9C show several different internally positions of the LED within the housing of the illumination device in accordance with the present invention.
Figure 9B:
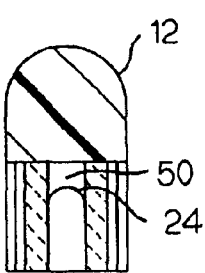
Figure 9C:
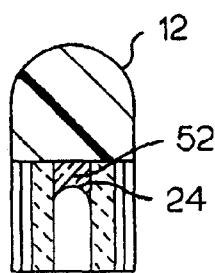

FIGS. 9A, 9B, and 9C represent in schematic form but a few of the alternate constructions in which the LEDs 24 are appropriately spaced from the apex point of the waveguide. FIG. 9A depicts a light scattering spacer member 48 between the waveguide 12 and the LED 24. Such spacer 48 could be fabricated from the same material as the waveguide 12, e.g., a high impact resistant acrylic material. FIG. 9B represents a construction in which the channel 18 is dimensioned so that the LED abuts an inner face of the channel and defines a space 50 between the apex of the LED housing and the waveguide 12. FIG. 3 shows the use of a transparent potting compound that fills the space between the LED 24 and waveguide 12. The compound could easily be introduced into the channel 18 after the LED 24 and circuit board 26 are placed therein.

Figures 10A, 10B:
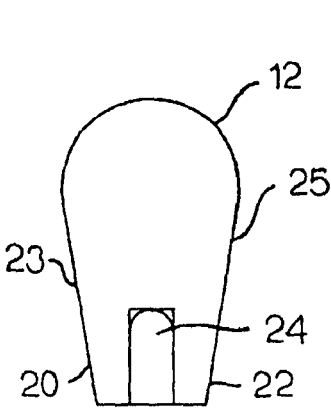
FIGS. 10A and 10B show examples of different housing configurations in accordance with the present invention.
Figure 11:
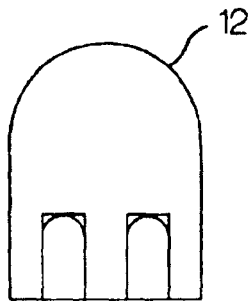
FIG. 11 illustrates the illumination device of the present invention incorporating a plurality of lines of LEDs.
Figure 14:
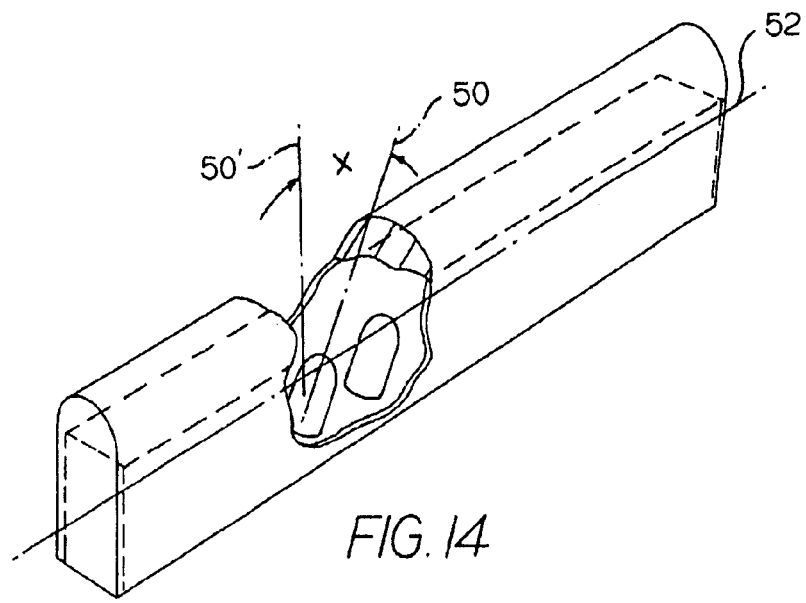
Figure 15:
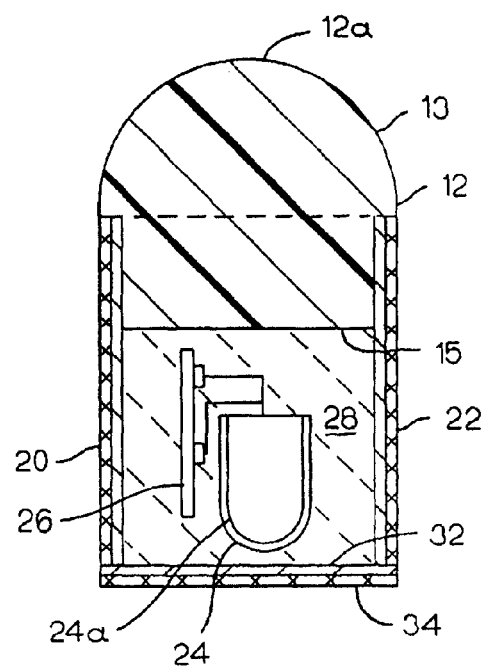
Figure 16:
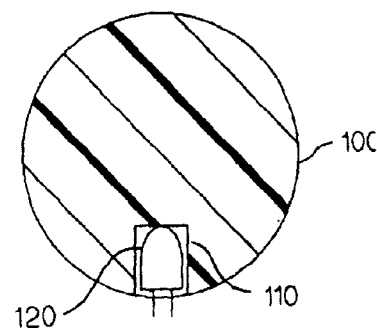
Figure 17:
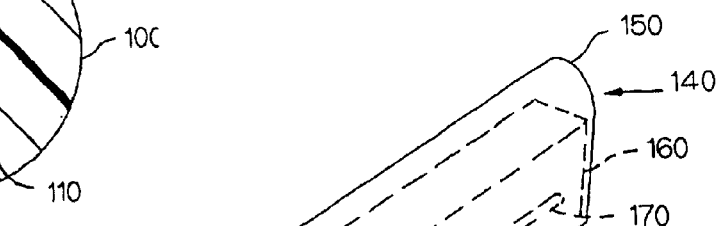
Figure 18:
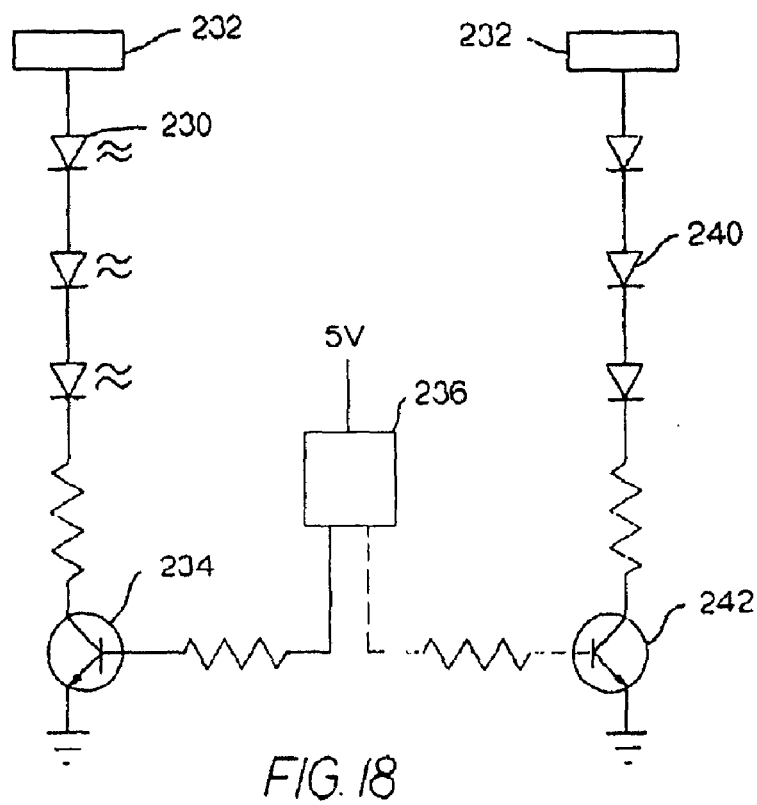

FIGS. 10A and 10B illustrate that the configuration of the illumination device 10 including the waveguide and/or housing could be changed as determined by the application to which the illumination device may be applied. FIG. 10A depicts parallel side walls 20, 22 that merge into sharply diverging side walls 23, 25 of the waveguide 12 while FIG. 10B illustrated as structure in which the walls 20, 22 diverge gradually and blend into the diverging side walls 23, 25 of the waveguide 12. FIG. 11 depicts further variations to the illumination device 10 where multiple strings of LEDs may be used in place of the single one discussed above. The various other elements including the reflective and absorption layers are not shown to maintain clarity.

Figure 14:
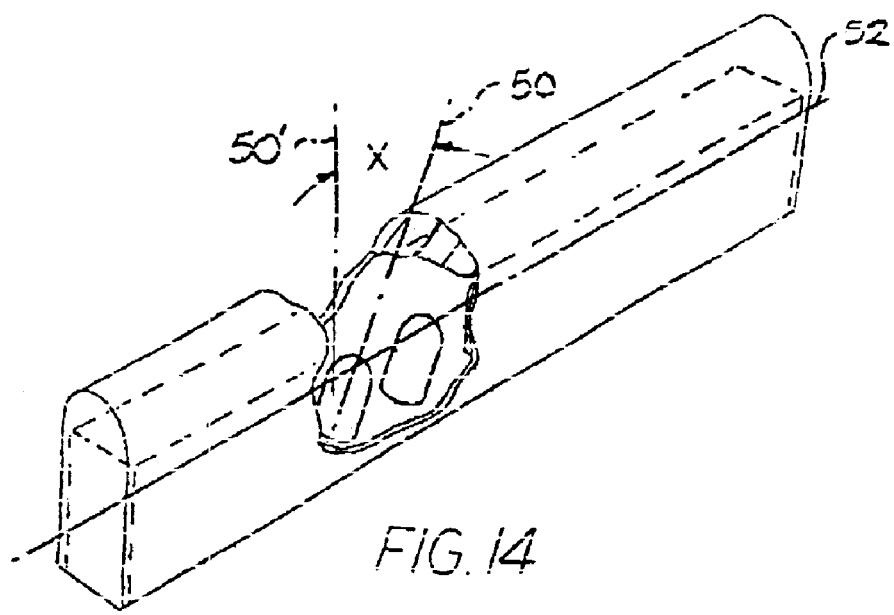
FIG. 14 shows a variation in the preferred embodiment in which the diodes are inclined within the housing.
Figure 15:
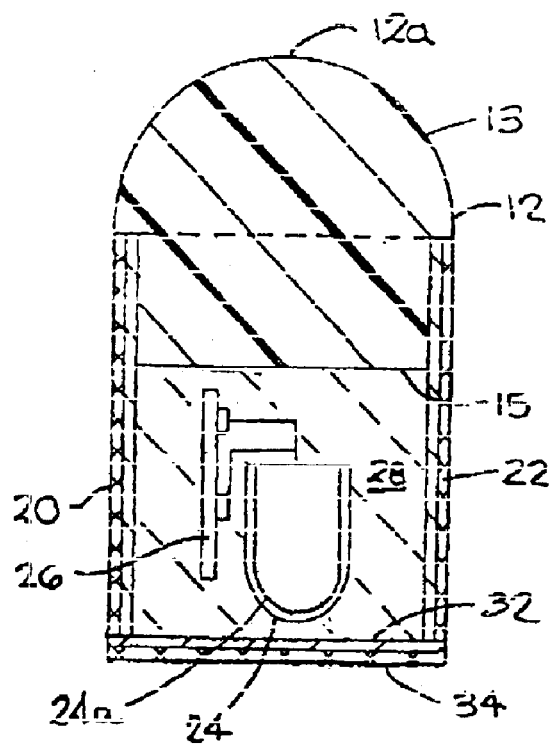
FIG. 15 shows still another variation in which the diodes are inverted within the housing.
Figure 1:
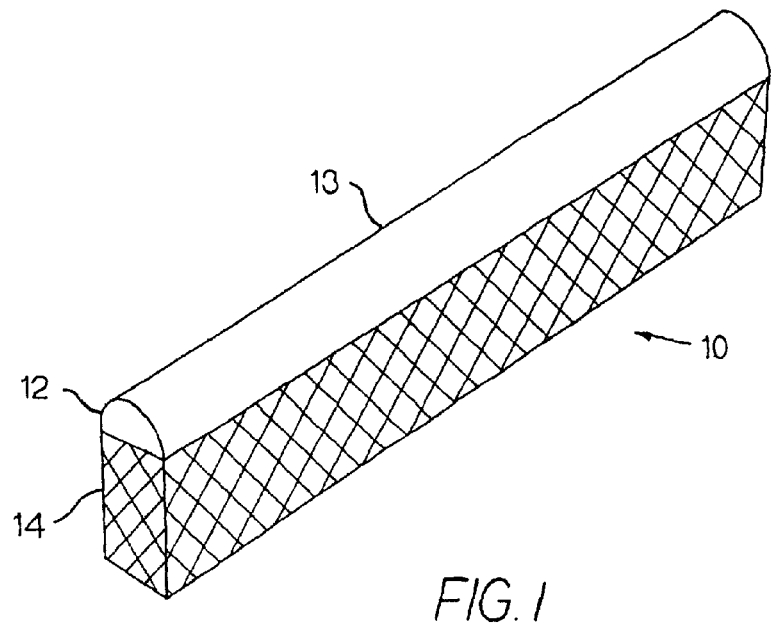
FIG. 1 is an elevated perspective view of an illumination device of the present invention.

Although it is preferred that the LEDs 24 be oriented in an upright position as depicted in FIG. 3 in order to provide the most efficient light intensity along the light pattern, other positioning arrangements-may be used. One example is shown in FIG. 14 where the positioning of the LEDs is tilted so that central axis 50' of the LEDs is placed at some predetermined angle X to the normal orientation 50 of the central LED axis to the longitudinal axis 52. FIG. 15 shows the LED 24 positioned with the apex positioned downwardly (vertically positioned or tilted) with respect to the axial length of the waveguide. The light collection of the various reflective surfaces direct the light from the LED 24 to the waveguide for the scattering in the same manner as described above.

Figure 16:
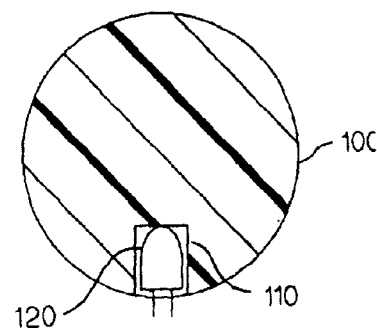
FIG. 16 shows an embodiment in which the LED is positioned within a channel defined in the body of the waveguide itself.

FIG. 16 depicts still another structure where the housing 110 of the LED 120 or point light source is incorporated directly in the body of the waveguide 100 with reflective and absorption layers not shown to maintain clarity.

Figure 17:
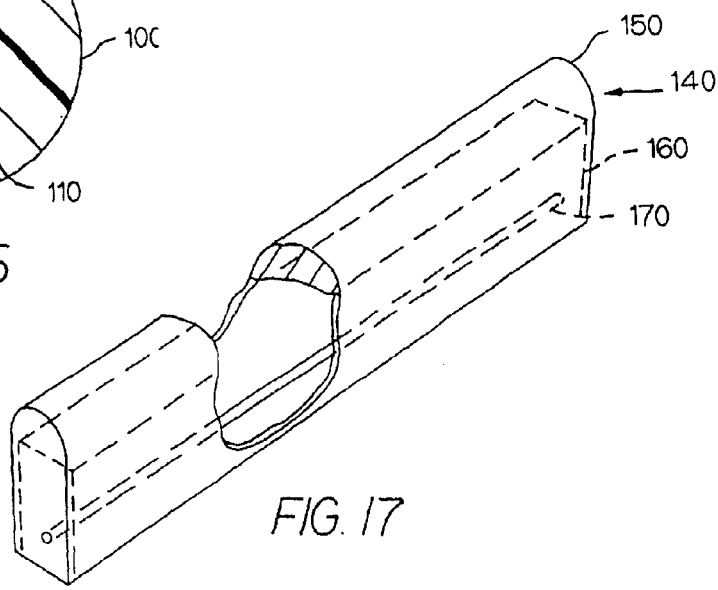
FIG. 17 illustrates still another embodiment in which the light source is a light source that itself is elongated and extends in a parallel relationship to the axis of the waveguide.

Technology is being developed where a light source may be fabricated in elongated or rope form from, for example, sheets of electro-luminescencing material that has sufficient light intensity to be juxtaposed to a leaky waveguide in place of the strings of LEDs. FIG. 17 illustrates that such a construction of an illumination device 140 showing an elongated light source 170 extending in a parallel relationship with the longitudinal axis of the waveguide 150 within the housing 160.

Figure 18:
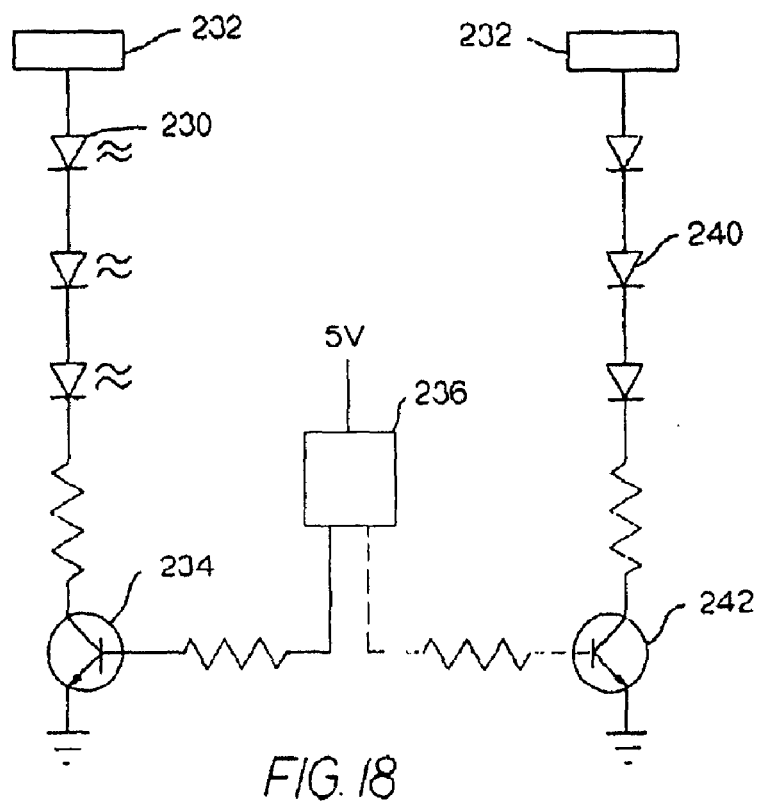
FIG. 18 representing a schematic of electrical circuitry incorporating LEDs for providing lighting sequences that may be used with the illumination device of the present invention.
Figure 1:
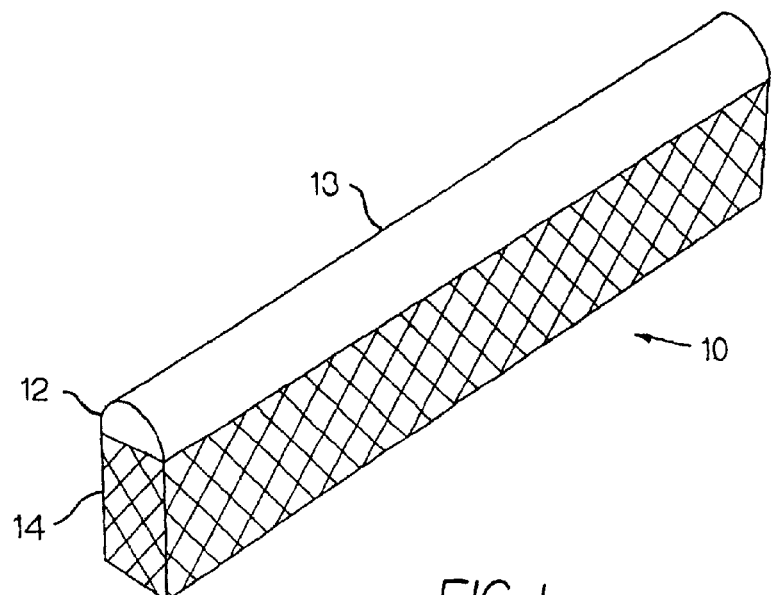
Figure 2:
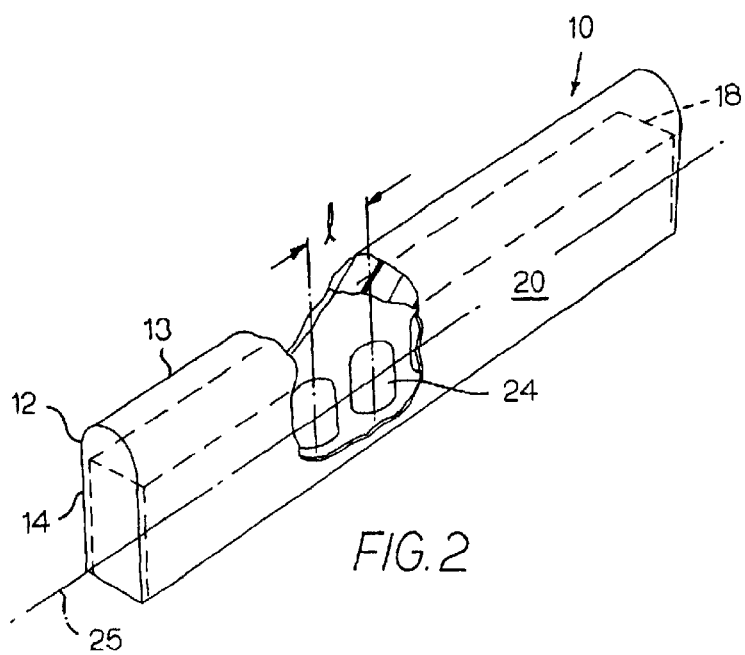
Figure 3:
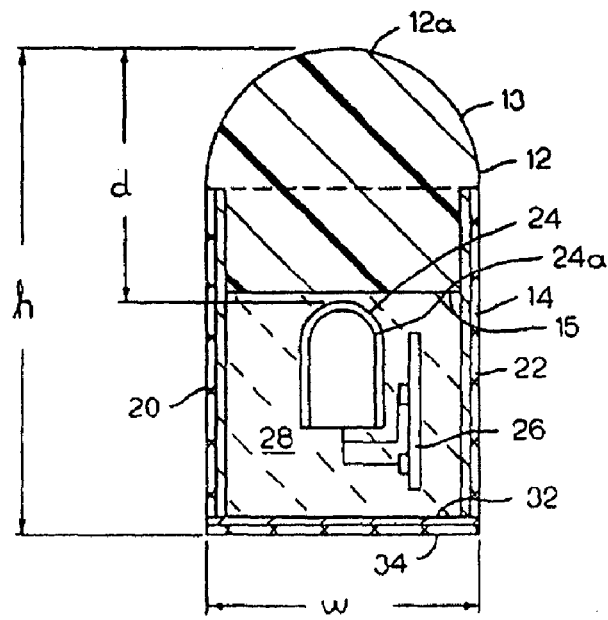
Figure 3A:
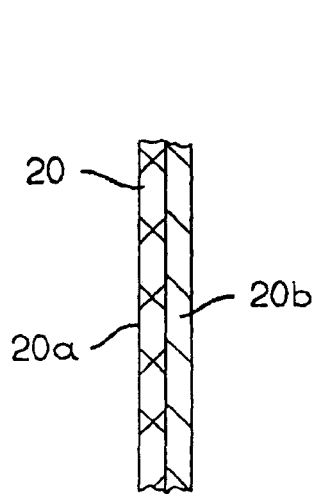
Figure 3B:
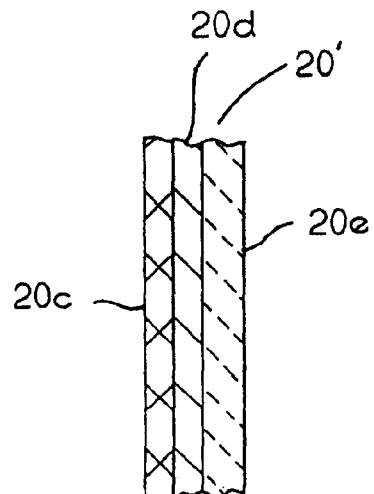
Figures 4, 5:
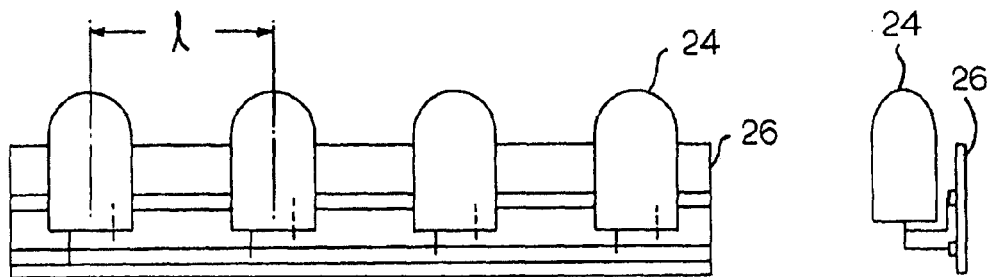
Figures 5A, 5B:
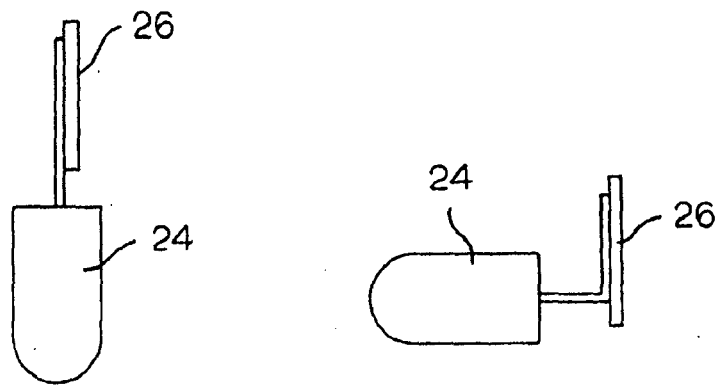
Figure 6:
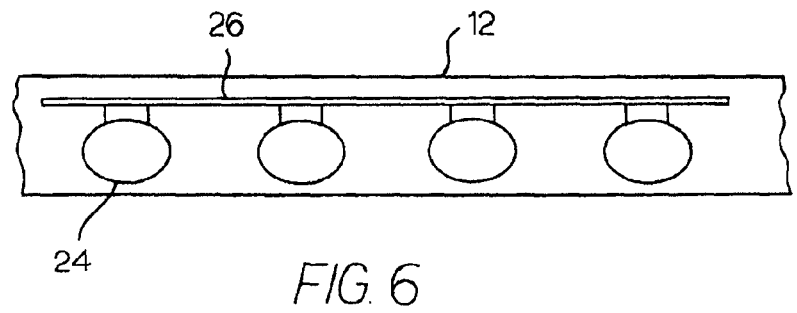
Figure 7A:
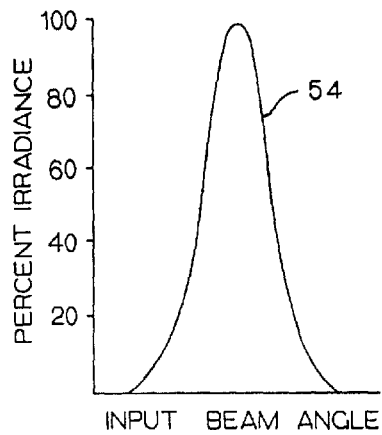
Figure 7B:
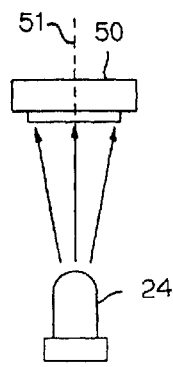
Figure 7C:
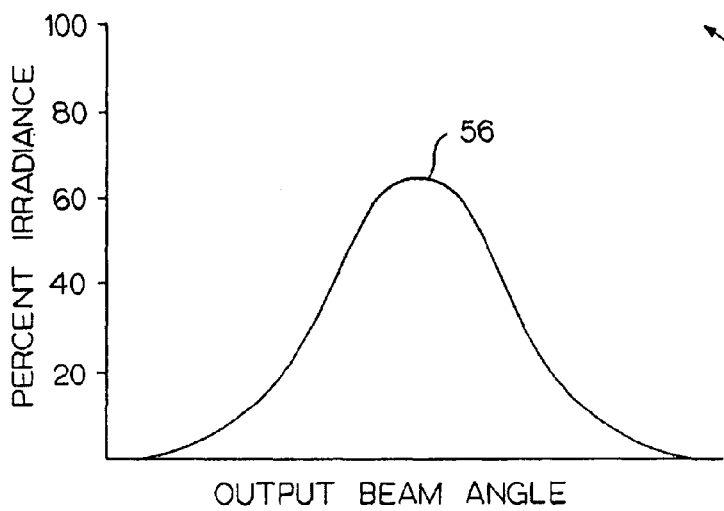
Figure 7D:
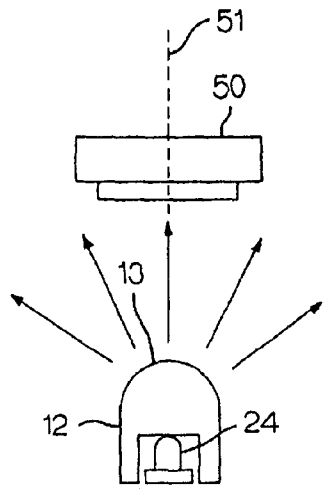
Figure 7E:
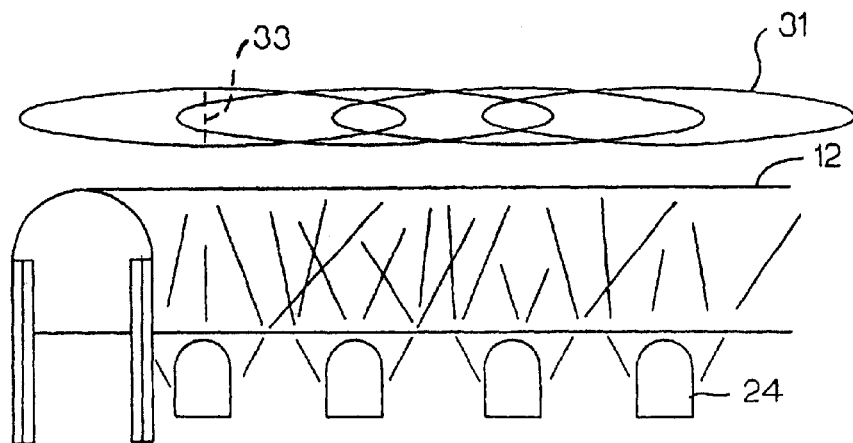
Figure 7F:
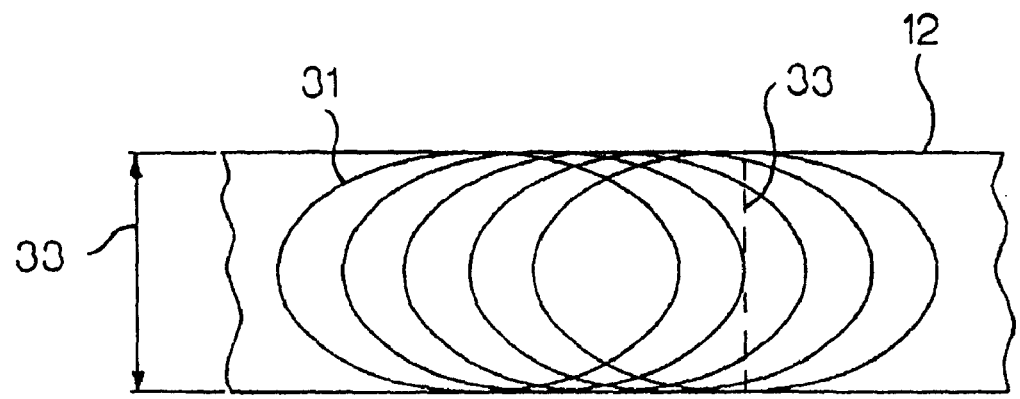
Figure 8:
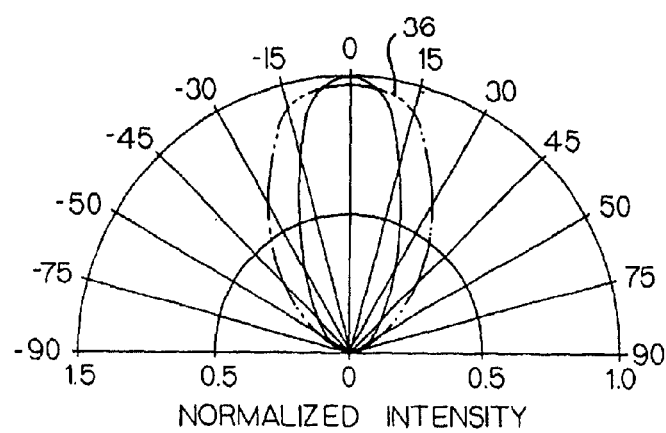
Figure 12:
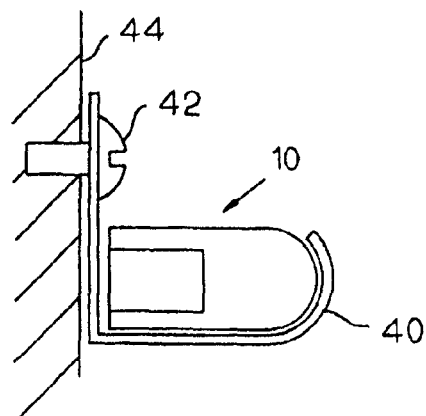
Figure 13:
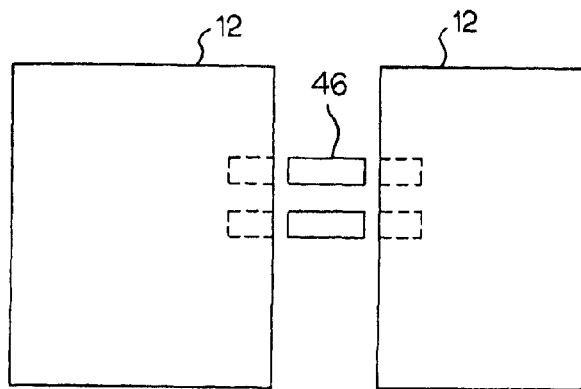

The thin and flexible circuit board 26 can be obtained from various sources such, as, for example, Flexible Circuit Technologies, Saint Paul Minn. The nature of the electrical connection and the circuitry on the board 26 depend upon the illumination sequence desired. While the circuitry is not part of the invention, it should be observed that the considerable sequence variety is permitted by the nature of the structure of the present invention. That is, the light weight, resistance to the rigors of packaging, handling, shipping, and installation, and the minimal heating aspects of the illumination device permit essentially endless possibilities for lighting and color sequences. The circuit board, may for example, be provided with various electrical components that permit flashing or fading of the light sources in timed sequences and give the effect of movement Various light source colors can be used and flashed/faded in almost any combination. If the LEDs are interlaced with different colors, then a striping effect can be obtained. FIG. 18 illustrates schematically a circuit which may be used with the present invention. A multiplicity of LEDs 230 are shown connected in series to a remote power source 232 and to a NPN transistor 234 in turned connected to a programmable controller 236. The LEDs 230 may be of the same color or in color groupings as desired. A second set of LEDs 240 (and additional sets of LEDs) similarly connected to the power source 232, NPN transistor 242, and controller 236 may be separately grouped or alternated with LEDs 230 as desired. Using the former grouping, the controller 236 could be programmed to cause the transistors to go on or off, thus causing the first group and then succeeding groups of LEDs to pulse or flash, simulating motion. Should each of the groups mounted in a device form a sequence of words, for example, "drink cola", the words could be flashed in sequence. If the LEDs of various groups were alternated in position, the resulting grouping could form a multi-color striping pattern.

From the discussion above, it may now be appreciated that the illumination device of the present invention is rugged and resists breakage that normally would be expected for neon lighting counterparts in shipping and handling. The illumination sources, preferably solid state lighting devices such as LEDs, uses far less electrical energy and remains relative cool to the touch. This allows the illumination device of the present invention to be used in places where the heat generated by neon lighting precludes its use. Moreover, the light weight of the illumination device facilitates mounting on support structures that could not support the relative heavy weight of neon lighting, and its required accessories including the high voltage infrastructure. Finally, the illumination device is flexible in its use, allowing a tremendous variety of lighting techniques very difficult to obtain in neon lighting without substantial expense. Other advantages and uses of the present invention will be clearly obvious to those skilled in the art upon a reading of the disclosure herein and are intended to be covered by the scope of the claims set forth below.

What is claimed is:

1. An illumination device for simulating neon lighting, comprising:
    an essentially solid, leaky waveguide rod having a predetermined length with a lateral light receiving surface and a lateral light emitting surface;
    an elongated light source extending substantially along said predetermined length of and positioned adjacent to said light receiving surface for emitting a portion of light emitted by said light source directly into said light receiving surface; and
    a housing positioned externally and adjacent to said waveguide rod and defining a volume that encompasses said elongated light source, whereby said housing includes side walls having internally light reflecting surfaces and serves to collect and direct light emitted by said light source into said lateral light receiving surface such that light is preferentially directed along the predetermined length of the leaky waveguide rod, exiting said light emitting surface in an elongated light intensity pattern that has a major axis extending along the length of said waveguide rod.

2. The illumination device of claim 1, and further including transparent material filling at least a portion of said volume and abutting said light receiving surface and said elongated light source, said transparent material having an index of refraction that reduces Fresnel losses between said light source and said waveguide.

3. The illumination device of claim 2, in which said elongated light source is a multiplicity of point light sources.

4. The illumination device of claim 3, in which said point light sources are light emitting diodes.

5. The illumination device of claim 4, in which the index of refraction of said transparent material is essentially the same as that of said waveguide rod and housings of said light emitting diodes.

6. The illumination device of claim 4, in which said light emitting diodes are positioned a distance from said light emitting surface sufficient to allow a light intensity pattern from each of said point light sources to overlap neighboring light intensity patterns so that the light intensity pattern collectively emitted from said light emitting surface appears uniform.

7. The light illumination device of claim 1, in which said waveguide rod is comprised of an acrylic with light scattering characteristics.

8. The illumination device of claim 1, in which said side walls have externally light absorbing surfaces.

* * * * *

UNITED STATES PATENT AND TRADEMARK OFFICE
CERTIFICATE OF CORRECTION

PATENT NO. : 6,953,262 B2
DATED : October 11, 2005
INVENTOR(S) : Mark Joseph Cleaver et al.

It is certified that error appears in the above-identified patent and that said Letters Patent is hereby corrected as shown below:

The title page should be deleted and substitute the attached title page.

Delete Drawing Sheets 1-22 and substitute the drawing sheets 1-22 as shown on the attached pages.

Signed and Sealed this

Thirtieth Day of May, 2006

JON W. DUDAS
*Director of the United States Patent and Trademark Office*

(12) United States Patent
Cleaver et al.

(10) Patent No.: US 6,953,262 B2
(45) Date of Patent: *Oct. 11, 2005

(54) ILLUMINATION DEVICE FOR SIMULATION OF NEON LIGHTING

(75) Inventors: Mark Joseph Cleaver, Wilmette, IL (US); Eric Olav Eriksson, Evanston, IL (US); George R. Hulse, Cookeville, TN (US)

(73) Assignee: i-Light Technologies, Inc., Evanston, IL (US)

(*) Notice: Subject to any disclaimer, the term of this patent is extended or adjusted under 35 U.S.C. 154(b) by 196 days.

This patent is subject to a terminal disclaimer.

(21) Appl. No.: 10/413,005

(22) Filed: Apr. 14, 2003

(65) Prior Publication Data

US 2003/0198046 A1 Oct. 23, 2003

Related U.S. Application Data

(63) Continuation of application No. 09/982,705, filed on Oct. 18, 2001, now Pat. No. 6,592,238.
(60) Provisional application No. 60/265,522, filed on Jan. 31, 2001.

(51) Int. Cl.[7] .................................................. F21V 21/00
(52) U.S. Cl. ................. 362/219; 362/249; 362/800; 362/267; 362/235
(58) Field of Search .................. 362/551, 555, 362/582, 219, 235, 800, 249, 267, 310; 385/901

(56) References Cited

U.S. PATENT DOCUMENTS

| | | | |
|---|---|---|---|
| 4,607,317 A | * | 8/1986 | Lin .............................. 362/249 |
| 5,057,981 A | * | 10/1991 | Bowen et al. ................. 362/219 |
| 5,964,981 A | * | 10/1999 | Nelson et al. ................. 156/423 |
| 6,146,006 A | * | 11/2000 | Cross ............................ 362/555 |
| 6,193,385 B1 | * | 2/2001 | Maki et al. .................... 362/108 |
| 6,361,186 B1 | * | 3/2002 | Slayden ......................... 362/249 |
| 6,366,727 B1 | * | 4/2002 | Nojiri et al. ................... 385/123 |
| 6,582,103 B1 | | 6/2003 | Popovich et al. |
| 6,676,284 B1 | | 1/2004 | Wilson |

FOREIGN PATENT DOCUMENTS

| | | |
|---|---|---|
| JP | 55-97903 | 7/1980 |
| JP | 62-41185 | 3/1986 |
| JP | 61-165583 | 10/1986 |
| JP | 61-286878 | 12/1986 |
| JP | 6-12021 | 1/1994 |
| JP | 3007923 | 12/1994 |
| JP | 2000-29406 | 1/2000 |
| JP | 2000-307152 | 11/2000 |

* cited by examiner

*Primary Examiner*—Thomas M. Sember
(74) *Attorney, Agent, or Firm*—Stites & Harbison, PLLC; Vance A. Smith; David W. Nagle, Jr.

(57) ABSTRACT

An illumination device for simulating neon lighting comprising a plurality of spaced point light sources positioned adjacent a lateral light receiving surface of a substantially rod-like waveguide made of a material that preferentially scatters light entering the light receiving surface such that the light intensity pattern exiting a lateral light emitting surface of the waveguide has a substantially uniform light intensity pattern.

8 Claims, 9 Drawing Sheets

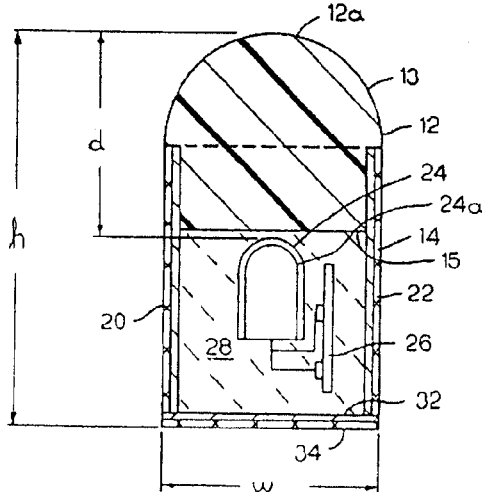

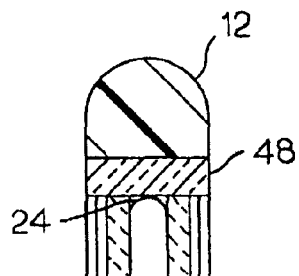
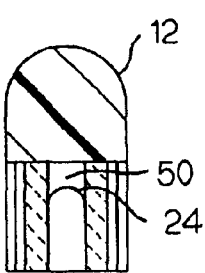
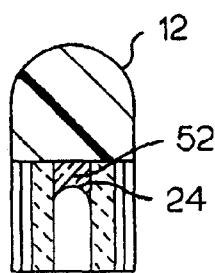
FIG. 9A    FIG. 9B    FIG. 9C
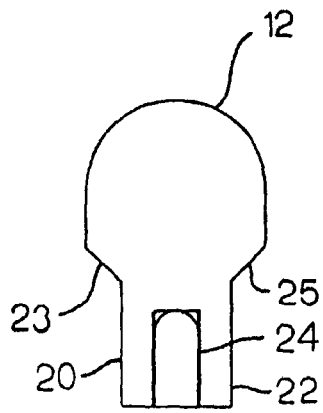
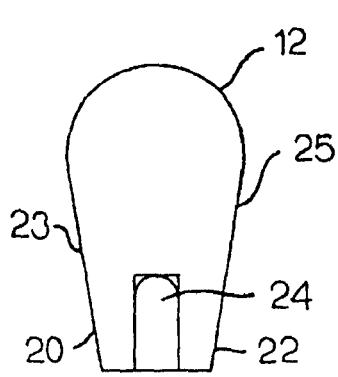
FIG. 10A    FIG. 10B
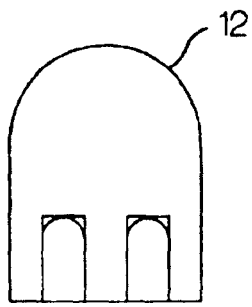
FIG. 11

UNITED STATES PATENT AND TRADEMARK OFFICE
CERTIFICATE OF CORRECTION

| | | |
|---|---|---|
| PATENT NO. | : 6,953,262 B2 | Page 1 of 11 |
| APPLICATION NO. | : 10/413005 | |
| DATED | : October 11, 2005 | |
| INVENTOR(S) | : Mark Joseph Cleaver et al. | |

It is certified that error appears in the above-identified patent and that said Letters Patent is hereby corrected as shown below:

The title page should be deleted and substitute the attached title page.

Delete Drawing Sheets 1-9 and substitute the drawing sheets 1-9 as shown on the attached pages.

This certificate supersedes Certificate of Correction issued May 30, 2006.

Signed and Sealed this

Twenty-seventh Day of June, 2006

JON W. DUDAS
*Director of the United States Patent and Trademark Office*

(12) United States Patent
Cleaver et al.

(10) Patent No.: US 6,953,262 B2
(45) Date of Patent: *Oct. 11, 2005

(54) ILLUMINATION DEVICE FOR SIMULATION OF NEON LIGHTING

(75) Inventors: Mark Joseph Cleaver, Wilmette, IL (US); Eric Olav Eriksson, Evanston, IL (US); George R. Hulse, Cookeville, TN (US)

(73) Assignee: i-Light Technologies, Inc., Evanston, IL (US)

(*) Notice: Subject to any disclaimer, the term of this patent is extended or adjusted under 35 U.S.C. 154(b) by 196 days.

This patent is subject to a terminal disclaimer.

(21) Appl. No.: 10/413,005

(22) Filed: Apr. 14, 2003

(65) Prior Publication Data

US 2003/0198046 A1 Oct. 23, 2003

Related U.S. Application Data

(63) Continuation of application No. 09/982,705, filed on Oct. 18, 2001, now Pat. No. 6,592,238.
(60) Provisional application No. 60/265,522, filed on Jan. 31, 2001.

(51) Int. Cl.[7] ............................................. F21V 21/00
(52) U.S. Cl. .................... 362/219; 362/249; 362/800; 362/267; 362/235
(58) Field of Search ............................. 362/551, 555, 362/582, 219, 235, 800, 249, 267, 310; 385/901

(56) References Cited

U.S. PATENT DOCUMENTS

| 4,607,317 A | * | 8/1986 | Lin ............................ 362/249 |
| 5,057,981 A | * | 10/1991 | Bowen et al. ............. 362/219 |
| 5,964,981 A | * | 10/1999 | Nelson et al. ............. 156/423 |
| 6,146,006 A | * | 11/2000 | Cross ......................... 362/555 |
| 6,193,385 B1 | * | 2/2001 | Maki et al. ................ 362/108 |
| 6,361,186 B1 | * | 3/2002 | Slayden ..................... 362/249 |
| 6,366,727 B1 | * | 4/2002 | Nojiri et al. ............... 385/123 |
| 6,582,103 B1 | | 6/2003 | Popovich et al. |
| 6,676,284 B1 | | 1/2004 | Wilson |

FOREIGN PATENT DOCUMENTS

| JP | 55-97903 | 7/1980 |
| JP | 62-41185 | 3/1986 |
| JP | 61-165583 | 10/1986 |
| JP | 61-286878 | 12/1986 |
| JP | 6-12021 | 1/1994 |
| JP | 3007923 | 12/1994 |
| JP | 2000-29406 | 1/2000 |
| JP | 2000-307152 | 11/2000 |

* cited by examiner

*Primary Examiner*—Thomas M. Sember
(74) *Attorney, Agent, or Firm*—Stites & Harbison, PLLC; Vance A. Smith; David W. Nagle, Jr.

(57) ABSTRACT

An illumination device for simulating neon lighting comprising a plurality of spaced point light sources positioned adjacent a lateral light receiving surface of a substantially rod-like waveguide made of a material that preferentially scatters light entering the light receiving surface such that the light intensity pattern exiting a lateral light emitting surface of the waveguide has a substantially uniform light intensity pattern.

8 Claims, 9 Drawing Sheets

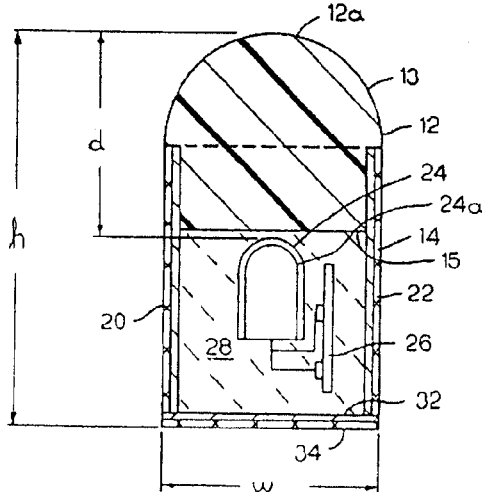

UNITED STATES PATENT AND TRADEMARK OFFICE
CERTIFICATE OF CORRECTION

| | | |
|---|---|---|
| PATENT NO. | : 6,953,262 C1 | Page 1 of 1 |
| APPLICATION NO. | : 95/001254 | |
| DATED | : September 11, 2012 | |
| INVENTOR(S) | : Mark Joseph Cleaver, Eric Olav Eriksson and George R. Hulse | |

It is certified that error appears in the above-identified patent and that said Letters Patent is hereby corrected as shown below:

ON THE TITLE PAGE:

Line (73) Assignee: Change "Bridge Bank, National Association, San Jose, CA (US)" to -- iLight Technologies, Inc., Chicago, IL (US) --.

Signed and Sealed this
Twenty-third Day of October, 2012

David J. Kappos
*Director of the United States Patent and Trademark Office*

US006953262C1

(12) INTER PARTES REEXAMINATION CERTIFICATE (0450th)
United States Patent
Cleaver et al.

(10) Number: US 6,953,262 C1
(45) Certificate Issued: *Sep. 11, 2012

(54) ILLUMINATION DEVICE FOR SIMULATION OF NEON LIGHTING

(75) Inventors: Mark Joseph Cleaver, Wilmette, IL (US); Eric Olav Eriksson, Evanston, IL (US); George R. Hulse, Cookeville, TN (US)

(73) Assignee: Bridge Bank, National Association, San Jose, CA (US)

Reexamination Request:
No. 95/001,254, Feb. 17, 2010

Reexamination Certificate for:
Patent No.: 6,953,262
Issued: Oct. 11, 2005
Appl. No.: 10/413,005
Filed: Apr. 14, 2003

(*) Notice: This patent is subject to a terminal disclaimer.

Certificate of Correction issued Jun. 27, 2006.

Related U.S. Application Data

(63) Continuation of application No. 09/982,705, filed on Oct. 18, 2001, now Pat. No. 6,592,238.

(60) Provisional application No. 60/265,522, filed on Jan. 31, 2001.

(51) Int. Cl.
*F21V 21/00* (2006.01)

(52) U.S. Cl. .......... 362/219; 362/249; 362/800; 362/267; 362/235

(58) Field of Classification Search ............ 362/219
See application file for complete search history.

(56) References Cited

To view the complete listing of prior art documents cited during the proceeding for Reexamination Control Number 95/001,254, please refer to the USPTO's public Patent Application Information Retrieval (PAIR) system under the Display References tab.

*Primary Examiner* — Linh M. Nguyen

(57) ABSTRACT

An illumination device for simulating neon lighting comprising a plurality of spaced point light sources positioned adjacent a lateral light receiving surface of a substantially rod-like waveguide made of a material that preferentially scatters light entering the light receiving surface such that the light intensity pattern exiting a lateral light emitting surface of the waveguide has a substantially uniform light intensity pattern.

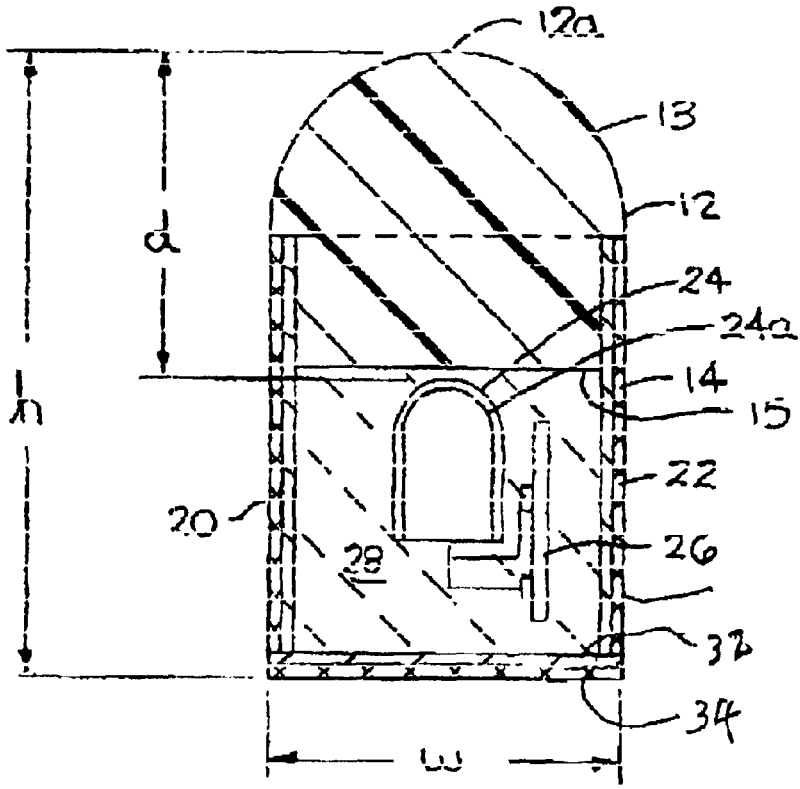

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claims 2 and 4-8, dependent on an amended claim, are determined to be patentable.

1. An illuminaton device for simulating neon lighting, comprising:
   an essentially solid, leaky waveguide rod having a predetermined length with a lateral light receiving surface and a lateral light emitting surface;
   an elongated light source extending substantially along said predetermined length of and positioned adjacent to said light receiving surface for emitting a portion of light emitted by said light source directly into said light receiving surface; and
   a housing positioned externally and adjacent to said waveguide rod and defining a volume that encompasses said elongated light source, whereby said housing includes side walls having internally light reflecting surfaces and serves to collect and direct light emitted by said light source into said lateral light receiving surface such that light is preferentially directed along the predetermined length of the leaky waveguide rod, exiting said light emitting surface in an elongated *substantially uniform* light intensity pattern that has a major axis extending along the length of said waveguide rod.

3. [The illumination device of claim 2, in which said elongated light source is] *An illumination device for simulating neon lighting, comprising:*
   *an essentially solid, leaky waveguide rod having a predetermined length with a lateral light receiving surface and a curve light emitting surface;*
   *a multiplicity of spaced point light sources extending substantially along said predetermined length of and positioned adjacent to said light receiving surface for emitting a portion of light emitted by said light source directly into said light receiving surface; and*
   *a housing positioned externally and adjacent to said waveguide rod and defining a volume that encompasses said elongated light source, whereby said housing includes side walls having internally light reflecting surfaces and serves to collect and direct light emitted by said light source into said lateral light receiving surface such that light is preferentially directed along the predetermined length of the leaky waveguide rod, exiting said curved light emitting surface in a substantially uniform light intensity pattern.*

\* \* \* \* \*